US011781965B2

(12) United States Patent
Karasikov et al.

(10) Patent No.: US 11,781,965 B2
(45) Date of Patent: Oct. 10, 2023

(54) SYSTEM AND METHOD FOR PARTICLES MEASUREMENT

(71) Applicant: PARTICLE MEASURING SYSTEMS, INC., Boulder, CO (US)

(72) Inventors: Nir Karasikov, Haifa (IL); Ori Weinstein, Haifa (IL); Shoam Shwartz, Haifa (IL); Mehran Vahdani Moghaddam, Haifa (IL); Uri Dubin, Haifa (IL)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 0 days.

(21) Appl. No.: 16/652,653

(22) PCT Filed: Oct. 25, 2018

(86) PCT No.: PCT/IL2018/051141
§ 371 (c)(1),
(2) Date: Mar. 31, 2020

(87) PCT Pub. No.: WO2019/082186
PCT Pub. Date: May 2, 2019

(65) Prior Publication Data
US 2020/0240896 A1    Jul. 30, 2020

Related U.S. Application Data
(60) Provisional application No. 62/577,403, filed on Oct. 26, 2017.

(51) Int. Cl.
*G01N 15/14*    (2006.01)
*G01N 15/10*    (2006.01)

(52) U.S. Cl.
CPC ..... *G01N 15/1434* (2013.01); *G01N 15/1459* (2013.01); *G01N 2015/1075* (2013.01);
(Continued)

(58) Field of Classification Search
CPC ........... G01N 15/1434; G01N 15/1459; G01N 2015/1075
See application file for complete search history.

(56) References Cited

U.S. PATENT DOCUMENTS

| 4,540,283 A | 9/1985 | Bachalo |
| 4,594,715 A | 6/1986 | Knollenberg |

(Continued)

FOREIGN PATENT DOCUMENTS

| AU | 2004256318 | 7/2004 |
| CN | 1587984 | 3/2005 |

(Continued)

OTHER PUBLICATIONS

European Office Action, dated Feb. 16, 2012, corresponding to European Patent Application No. 04744956.6, 5 pp.
(Continued)

*Primary Examiner* — Rebecca C Bryant
(74) *Attorney, Agent, or Firm* — Leydig, Voit & Mayer, Ltd.

(57) ABSTRACT

An optical system for particle size and concentration analysis, includes: at least one laser that produces an illuminating beam; a focusing lens that focuses the illuminating beam on particles that move relative to the illuminating beam at known or pre-defined angles to the illuminating beam through the focal region of the focusing lens; and at least two forward-looking detectors, that detect interactions of particles with the illuminating beam in the focal region of the focusing lens. The focusing lens is a cylindrical lens that forms a focal region that is: (i) narrow in the direction of relative motion between the particles and the illuminating beam, and (ii) wide in a direction perpendicular to a plane defined by an optical axis of the system and the direction of relative motion between the particles and the illuminating
(Continued)

beam. Each of the two forward-looking detectors is comprised of two segmented linear arrays of detectors.

25 Claims, 19 Drawing Sheets

(52) U.S. Cl.
CPC ............... *G01N 2015/1486* (2013.01); *G01N 2015/1493* (2013.01)

(56) References Cited

U.S. PATENT DOCUMENTS

| | | |
|---|---|---|
| 4,690,561 A | 9/1987 | Ito |
| 4,783,599 A | 11/1988 | Borden |
| 4,798,465 A | 1/1989 | Knollenberg |
| 4,806,774 A | 2/1989 | Lin et al. |
| 4,854,705 A | 8/1989 | Bachalo |
| 4,893,928 A | 1/1990 | Knollenberg |
| 4,906,094 A | 3/1990 | Ashida |
| 4,917,494 A | 4/1990 | Poole et al. |
| 4,963,003 A | 10/1990 | Hiiro |
| 4,989,978 A | 2/1991 | Groner |
| 5,063,301 A | 11/1991 | Turkevich et al. |
| 5,282,151 A | 1/1994 | Knollenberg |
| 5,283,199 A | 2/1994 | Bacon, Jr. et al. |
| 5,471,298 A | 11/1995 | Moriya |
| 5,532,943 A | 7/1996 | Asano et al. |
| 5,619,043 A | 4/1997 | Preikschat et al. |
| 5,660,985 A | 8/1997 | Pieken et al. |
| 5,671,046 A | 9/1997 | Knowlton |
| 5,719,667 A | 2/1998 | Miers |
| 5,726,753 A | 3/1998 | Sandberg |
| 5,739,527 A | 4/1998 | Hecht et al. |
| 5,740,079 A | 4/1998 | Shigemori et al. |
| 5,751,422 A | 5/1998 | Mitchell |
| 5,805,281 A | 9/1998 | Knowlton et al. |
| 5,861,950 A | 1/1999 | Knowlton |
| 5,889,589 A | 3/1999 | Sandberg |
| 5,903,338 A | 5/1999 | Mavliev et al. |
| 5,995,650 A | 11/1999 | Migdal et al. |
| 5,999,256 A | 12/1999 | Jones |
| 6,084,671 A | 7/2000 | Holcomb |
| 6,137,572 A | 10/2000 | DeFreez et al. |
| 6,167,107 A | 12/2000 | Bates |
| 6,246,474 B1 | 6/2001 | Cerni et al. |
| 6,275,290 B1 | 8/2001 | Cerni et al. |
| 6,532,067 B1 | 3/2003 | Chang et al. |
| 6,615,679 B1 | 9/2003 | Knollenberg et al. |
| 6,709,311 B2 | 3/2004 | Cerni |
| 6,859,277 B2 | 2/2005 | Wagner et al. |
| 6,903,818 B2 | 6/2005 | Cerni et al. |
| 6,945,090 B2 | 9/2005 | Rodier |
| 7,030,980 B1 | 4/2006 | Sehler et al. |
| 7,088,446 B2 | 8/2006 | Cerni |
| 7,088,447 B1 | 8/2006 | Bates et al. |
| 7,092,078 B2 | 8/2006 | Nagai et al. |
| 7,208,123 B2 | 4/2007 | Knollenberg et al. |
| 7,235,214 B2 | 6/2007 | Rodier et al. |
| RE39,783 E | 8/2007 | Cerni et al. |
| 7,456,960 B2 | 11/2008 | Cerni et al. |
| 7,526,158 B2 | 4/2009 | Novotny et al. |
| 7,528,959 B2 | 5/2009 | Novotny et al. |
| 7,561,267 B2 | 7/2009 | Luo et al. |
| 7,576,857 B2 | 8/2009 | Wagner |
| 7,630,147 B1 | 12/2009 | Kar et al. |
| 7,667,839 B2 | 2/2010 | Bates |
| 7,746,469 B2 | 6/2010 | Shamir et al. |
| 7,796,255 B2 | 9/2010 | Miller |
| 7,876,450 B2 | 1/2011 | Novotny et al. |
| 7,916,293 B2 | 3/2011 | Mitchell et al. |
| 7,973,929 B2 | 7/2011 | Bates |
| 7,985,949 B2 | 7/2011 | Rodier |
| 8,027,035 B2 | 9/2011 | Mitchell et al. |
| 8,109,129 B2 | 2/2012 | Gorbunov |
| 8,154,724 B2 | 4/2012 | Mitchell et al. |
| 8,174,697 B2 | 5/2012 | Mitchell et al. |
| 8,427,642 B2 | 4/2013 | Mitchell et al. |
| 8,465,791 B2 | 6/2013 | Liu et al. |
| 8,605,282 B2 * | 12/2013 | Groswasser ........... G01N 21/23 356/367 |
| 8,800,383 B2 | 8/2014 | Bates |
| 8,822,952 B2 | 9/2014 | Muto et al. |
| 8,869,593 B2 | 10/2014 | Gorbunov et al. |
| 9,063,117 B2 * | 6/2015 | Gourley ............. G01N 33/4833 |
| 9,068,916 B2 * | 6/2015 | Heng ................. G01N 15/147 |
| 9,631,222 B2 | 4/2017 | Ketcham et al. |
| 9,638,665 B2 | 5/2017 | Gorbunov |
| 9,682,345 B2 | 6/2017 | Gromala et al. |
| 9,808,760 B2 | 11/2017 | Gromala et al. |
| 9,810,558 B2 | 11/2017 | Bates et al. |
| 9,857,284 B1 | 1/2018 | Javadi et al. |
| 9,885,640 B2 | 2/2018 | Ketcham et al. |
| 9,952,136 B2 | 4/2018 | Javadi et al. |
| 9,983,113 B2 | 5/2018 | Matsuda et al. |
| 9,989,462 B2 | 6/2018 | Lumpkin et al. |
| 10,078,045 B2 | 9/2018 | Diebold et al. |
| 10,197,487 B2 | 2/2019 | Knollenberg et al. |
| 10,288,546 B2 | 5/2019 | Diebold et al. |
| 10,345,200 B2 | 7/2019 | Scialo et al. |
| 10,345,246 B2 | 7/2019 | Tian et al. |
| 10,371,620 B2 | 8/2019 | Knollenberg et al. |
| 10,416,069 B2 | 9/2019 | Saitou et al. |
| 10,997,845 B2 | 5/2021 | MacLaughlin et al. |
| 11,181,455 B2 | 11/2021 | Bates et al. |
| 11,215,546 B2 | 1/2022 | MacLaughlin et al. |
| 11,231,345 B2 | 1/2022 | Scialo et al. |
| 11,237,095 B2 * | 2/2022 | Rodier ............... G01N 15/1436 |
| 11,250,684 B2 | 2/2022 | MacLaughlin et al. |
| 11,255,760 B2 | 2/2022 | Scialo et al. |
| 11,268,930 B2 | 3/2022 | Rodier et al. |
| 11,320,360 B2 | 5/2022 | Lumpkin et al. |
| 11,385,161 B2 | 7/2022 | Bates et al. |
| 11,416,123 B2 | 8/2022 | Pandolfi et al. |
| 11,428,617 B2 | 8/2022 | Knollenberg et al. |
| 11,428,619 B2 | 8/2022 | Knollenberg et al. |
| 11,576,045 B2 | 2/2023 | Michaelis et al. |
| 2004/0011975 A1 | 1/2004 | Nicoli et al. |
| 2004/0021868 A1 | 2/2004 | Ortyn et al. |
| 2004/0023293 A1 | 2/2004 | Kreimer et al. |
| 2004/0036874 A1 | 2/2004 | Kramer |
| 2005/0028593 A1 | 2/2005 | Rodier |
| 2005/0138934 A1 | 6/2005 | Weigert et al. |
| 2007/0030492 A1 | 2/2007 | Novotny et al. |
| 2007/0165225 A1 | 7/2007 | Trainer |
| 2007/0259440 A1 | 11/2007 | Zhou et al. |
| 2007/0263215 A1 | 11/2007 | Bachalo et al. |
| 2008/0079929 A1 | 4/2008 | Luo et al. |
| 2009/0078862 A1 | 3/2009 | Rodier et al. |
| 2009/0190128 A1 | 7/2009 | Cerni et al. |
| 2009/0268202 A1 | 10/2009 | Wagner |
| 2009/0323061 A1 | 12/2009 | Novotny et al. |
| 2010/0220315 A1 | 9/2010 | Morell et al. |
| 2010/0328657 A1 | 12/2010 | Dholakia et al. |
| 2012/0100521 A1 | 4/2012 | Soper et al. |
| 2014/0177932 A1 | 6/2014 | Milne et al. |
| 2014/0226158 A1 * | 8/2014 | Trainer ................. G01J 3/453 356/336 |
| 2015/0000595 A1 | 1/2015 | Gorbunov et al. |
| 2015/0259723 A1 | 9/2015 | Hartigan et al. |
| 2015/0260628 A1 | 9/2015 | Shamir |
| 2015/0316464 A1 | 11/2015 | Gourley |
| 2016/0126081 A1 | 5/2016 | Gorbunov |
| 2016/0139013 A1 | 5/2016 | Gorbunov |
| 2016/0290915 A1 | 10/2016 | Chen et al. |
| 2017/0059485 A1 | 3/2017 | Yamamoto et al. |
| 2017/0089826 A1 | 3/2017 | Lin |
| 2017/0176312 A1 | 6/2017 | Shamir |
| 2017/0191924 A1 | 7/2017 | Pristinski |
| 2017/0336328 A1 | 11/2017 | Gupta et al. |
| 2018/0133744 A1 | 5/2018 | Gorbunov et al. |
| 2018/0266938 A1 | 9/2018 | Chow |
| 2018/0269250 A1 | 9/2018 | Chow |
| 2018/0270434 A1 | 9/2018 | Chow |

(56) References Cited

U.S. PATENT DOCUMENTS

| | | |
|---|---|---|
| 2018/0270435 A1 | 9/2018 | Chow |
| 2018/0313796 A1 | 11/2018 | Jeannotte |
| 2019/0204208 A1 | 7/2019 | Diebold et al. |
| 2019/0250785 A1 | 8/2019 | Pandolfi et al. |
| 2019/0277745 A1 | 9/2019 | Matsuda et al. |
| 2019/0323943 A1 | 10/2019 | Knollenberg et al. |
| 2019/0346345 A1 | 11/2019 | Scialo et al. |
| 2020/0072724 A1 | 3/2020 | Knollenberg et al. |
| 2020/0072729 A1 | 3/2020 | Lumpkin et al. |
| 2020/0150017 A1 | 5/2020 | Bates et al. |
| 2020/0150018 A1 | 5/2020 | Shamir |
| 2020/0156057 A1 | 5/2020 | Tomaras |
| 2020/0158603 A1 | 5/2020 | Scialo et al. |
| 2020/0158616 A1 | 5/2020 | Knollenberg et al. |
| 2020/0355599 A1 | 11/2020 | Rodier et al. |
| 2021/0041364 A1 | 2/2021 | Yi et al. |
| 2021/0044978 A1 | 2/2021 | Michaelis et al. |
| 2021/0063349 A1 | 3/2021 | Rodier et al. |
| 2021/0136722 A1 | 5/2021 | Scialo et al. |
| 2021/0140867 A1 | 5/2021 | Knollenberg et al. |
| 2021/0190659 A1 | 6/2021 | Knollenberg et al. |
| 2021/0208054 A1 | 7/2021 | Ellis et al. |
| 2021/0223273 A1 | 7/2021 | Scialo et al. |
| 2021/0381948 A1 | 12/2021 | Rodier et al. |
| 2022/0155212 A1 | 5/2022 | Rodier et al. |
| 2022/0228963 A1 | 7/2022 | Shamir et al. |
| 2022/0364971 A1 | 11/2022 | Kondo et al. |
| 2022/0397495 A1 | 12/2022 | Yates et al. |
| 2022/0397510 A1 | 12/2022 | Yates et al. |
| 2022/0397519 A1 | 12/2022 | Knollenberg et al. |
| 2023/0009668 A1 | 1/2023 | Scialò et al. |
| 2023/0087059 A1 | 3/2023 | Knollenberg et al. |

FOREIGN PATENT DOCUMENTS

| | | |
|---|---|---|
| CN | 101153868 A | 4/2008 |
| CN | 103959039 A | 7/2014 |
| EP | 1083424 | 3/2001 |
| EP | 1642113 | 4/2014 |
| JP | S57-037251 | 3/1982 |
| JP | H03002544 A1 | 1/1991 |
| JP | H04188041 | 7/1992 |
| JP | H08-054388 | 2/1996 |
| JP | H11118946 A1 | 4/1999 |
| JP | 2004184135 A1 | 7/2004 |
| JP | 2010101879 A1 | 5/2010 |
| JP | 2011133460 | 7/2011 |
| JP | 6309896 | 4/2018 |
| WO | WO 98/50779 | 11/1998 |
| WO | WO 99/06823 A1 | 2/1999 |
| WO | WO 2005/005965 | 1/2005 |
| WO | WO 2007/100615 A2 | 9/2007 |
| WO | WO 2013/181453 | 5/2013 |
| WO | WO 2013/080209 | 6/2013 |
| WO | WO 2018/170232 | 9/2018 |
| WO | WO 2018/170257 | 9/2018 |
| WO | WO 2019/082186 | 5/2019 |
| WO | WO 2019/171044 | 9/2019 |
| WO | WO 2020/219841 | 10/2020 |
| WO | WO 2021/102256 | 5/2021 |

OTHER PUBLICATIONS

European Office Action, dated Sep. 24, 2013, corresponding to European Patent Application No. 04744956.6, 7 pp.
European Office Action, dated Oct. 8, 2020, corresponding to European Patent Application No. 12854152.1, 8 pp.
Shamir et al. (2011) "Singular beams in metrology and nanotechnology," Tribute to Joseph W. Goodman, SPIE 8122(1): 1-8.
International Search Report and Written Opinion corresponding to PCT/IL2018/051141, dated Feb. 21, 2019.
Allen (1983) "Particle Size Analysis," John Wiley & Sons; ISBN: 0471262218 (table of contents only), 5 pp.
Bouhelier et al. (2003) "Near-field scattering of longitudinal fields," Applied Physics Letters 82(25): 4596-4598.
Bouhelier et al. (2003) "Near-Field Second-Harmonic Generation Induced by Local Field Enhancement," Physical Review Letters 90(1): 013903-1-013903-4.
Bouhelier et al. (2003) "Plasmon-coupled tip-enhanced near-field optical microscopy," J. of Microscopy 210: 220-224.
Durst et al. (1981) "Light scattering by small particles refined numerical computations," Report SFB 80/TM/195 (table of contents), 2 pp.
Durst et al. (1981) "Light scattering by small particles refined numerical computations," Report SFB 80/TM/195, English translation, 2 pp.
Friedmann et al. (1996) "Surface Analysis Using Multiple Coherent Beams," Electrical and Electronics Engineers in Israel, 537-540.
Friedmann et al. (1997) "Resolution enhancement by extrapolation of the optically measured spectrum of surface profiles," Appl. Opt. 36: 1747-1751.
Goldberg et al. (2002) "Immersion Lens Microscopy of Photonic Nanostructures and Quantum Dots," IEEE Journal of Selected Topics in Quantum Electronics 8(5): 1051-1059.
Hemo et al. (2011) "Scattering of singular beams by subwavelength objects," Applied Optics 50(1):33-42.
Ignatovich et al. (2006) "Real-Time and Background-Free Detection of Nanoscale Particles," Physical Review Letters 96(1): 013901-1-013901-4.
International Search Report and Written Opinion corresponding to PCT/IL2012/050488, dated Mar. 21, 2013.
International Preliminary Report on Patentability corresponding to PCT/IL2012/050488, dated Jun. 3, 2014.
International Search Report and Written Opinion corresponding to PCT/IL2004/000616, dated Nov. 12, 2004.
International Preliminary Report on Patentability corresponding to PCT/IL2004/000616, dated Oct. 24, 2005.
Japanese Search Report corresponding to Application No. 2014-544046, dated Jul. 28, 2016.
Jones (1999) "Light scattering for particle characterization," Progress in Energy and Combustion Science 25(1): 1-53.
Korean Notice of Preliminary Rejection corresponding to Korean Patent Application No. 10-2014-7017139, dated Sep. 23, 2019.
Matizen et al. (1987) "Formation of non-gaussian light beams with the aid of a spatially inhomogeneous amplitude filter," Soviet Journal of Quantum Electronics 17(7): 886-887.
Notice of Allowance corresponding to Korean Patent Application No. 10-2014-7017139, dated Feb. 18, 2020.
Notification of Reasons for Refusal corresponding to Japanese Patent Application No. 2014-544046, dated Sep. 26, 2016.
Notification of Reasons for Refusal corresponding to Japanese Patent Application No. 2014-544046, dated Aug. 28, 2017.
Notification of Reason for Refusal corresponding to Korean Patent Application No. 10-2014-7017139, dated Nov. 22, 2018, 9 pp.
Office Action (First) corresponding to Chinese Patent Application No. 201280059154.7, dated Jun. 17, 2015.
Office Action (Second) corresponding to Chinese Patent Application No. 201280059154.7, dated May 9, 2016.
Piestun et al. (1994) "Control of wave-front propagation with diffractive elements," Opt. Lett. 19(11):771-773.
Piestun et al. (1996) "Unconventional Light Distributions in three-dimensional domains," J. Mod. Opt. 43(7): 1495-1507.
Piestun et al. (1996) "Wave fields in three dimensions: Analysis and synthesis," J. Opt. Soc. Am. A 13(9): 1837-1848.
Piestun et al. (1998) "Pattern generation with extended focal depth," Appl. Opt. 37: 5394-5398.
Piestun (2001) "Multidimensional Synthesis of Light Fields," Optics and Photonics News 12(11): 28-32.
Piestun et al. (2002) "Synthesis of three-dimensional light-fields and applications," Proc. IEEE 90(2):222-244.
Search Opinion corresponding to European Patent Application No. 12854152.1, completed Jun. 2, 2015.
Shamir (Jul. 2012) "Singular beams in metrology and nanotechnology," Optical Engineering 51(7): 073605-1-073605-8.
Spektor et al. (1996) "Dark beams with a constant notch," Opt. Lett. 21(7):456-458.

(56) References Cited

OTHER PUBLICATIONS

Supplementary Search corresponding to Chinese Patent Application No. 2012800591547, dated Apr. 28, 2016.
Weiner et al. (1998) "Improvements in Accuracy and Speed Using the Time-of-Transition Method and Dynamic Image Analysis for Particle Sizing," American Chemical Society, Chapter 8: 88-102.
International Search Report and Written Opinion, dated Feb. 26, 2021, corresponding to International Patent Application No. PCT/US2020/061493, 12 pages.
International Search Report and Written Opinion, dated Jul. 28, 2020, corresponding to International Patent Application No. PCT/US2020/029765, 11 pages.
European Office Action, dated Jan. 22, 2009, corresponding to European Patent Application No. 04744956.6, 2 pp.
European Extended Search Report, dated Jul. 13, 2021, corresponding to EP 18871675.7—10 pp.
"Innovative On-Line Particle Analyzer," (Jun. 2012) Innovative Particle-Monitoring Technologies Poster, 1 pp.
"Nano-particle analysis using dark laser beam sensor," (Jun. 2014) Innovative Particle-Monitoring Technologies Poster, 1 pp.
Shamir et al. (May 2013) "Novel particle sizing technology," 6 pp.
U.S. Appl. No. 16/953,987, filed Nov. 20, 2020.
U.S. Appl. No. 17/341,998, filed Jun. 8, 2021.
U.S. Appl. No. 10/563,662, filed Jan. 24, 2007.
U.S. Appl. No. 14/359,233, filed May 19, 2014.
U.S. Appl. No. 15/440,287, filed Feb. 23, 2017.
U.S. Appl. No. 16/680,125, filed Nov. 11, 2019.
U.S. Appl. No. 17/570,228, filed Jan. 6, 2022.
U.S. Appl. No. 16/857,678, filed Apr. 24, 2020.
U.S. Appl. No. 17/553,216, filed Dec. 16, 2021.

\* cited by examiner

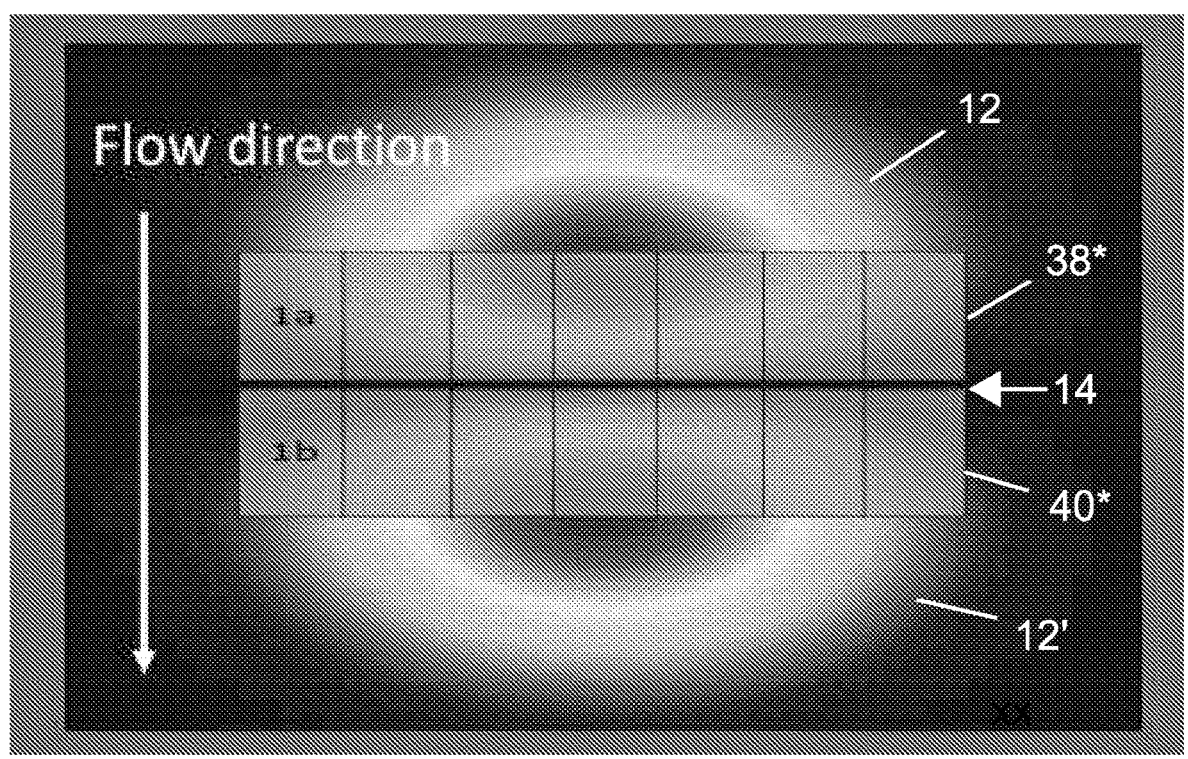
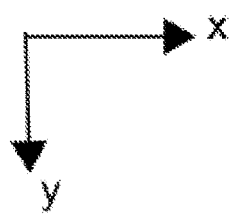
Fig. 5

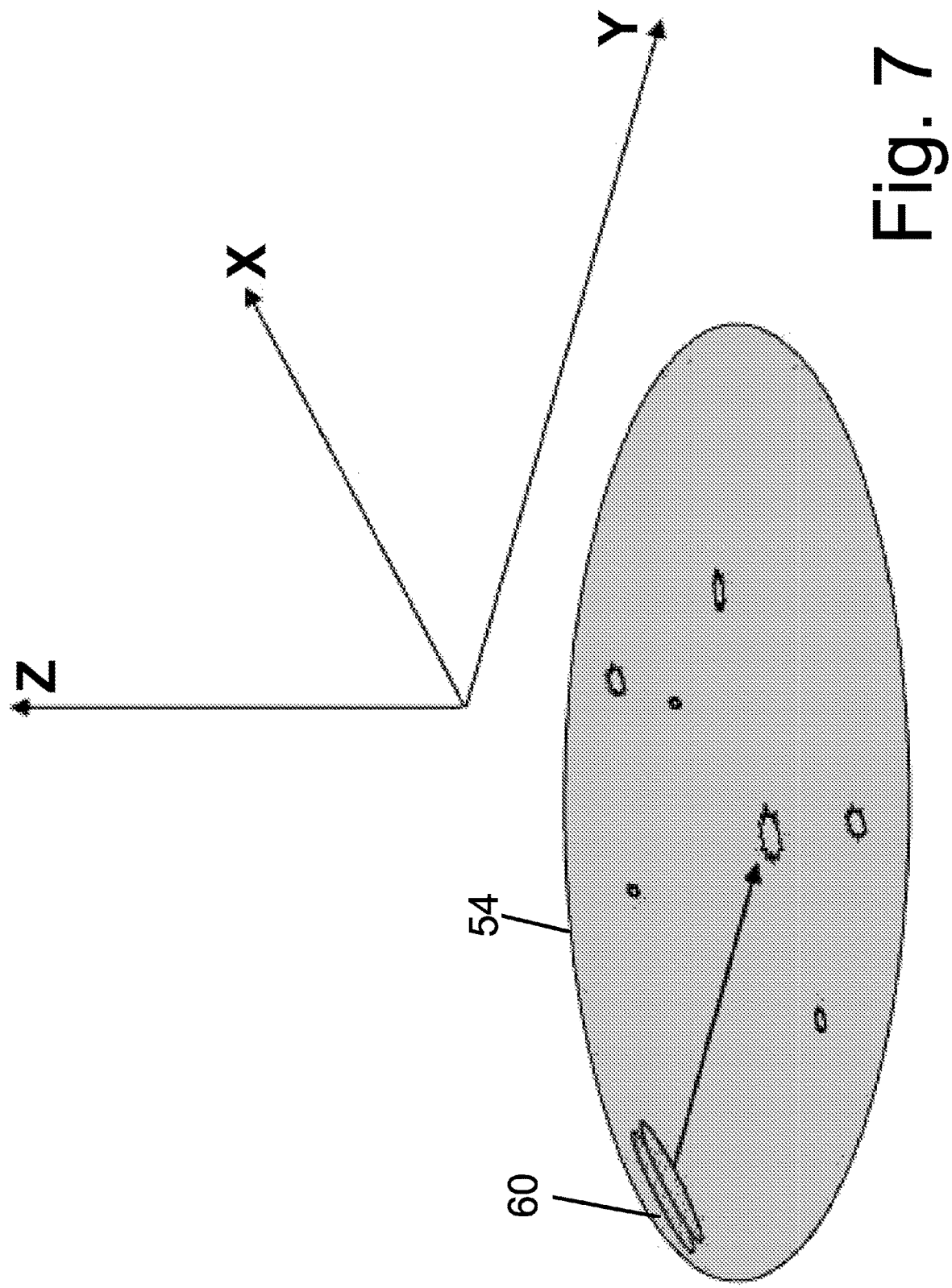

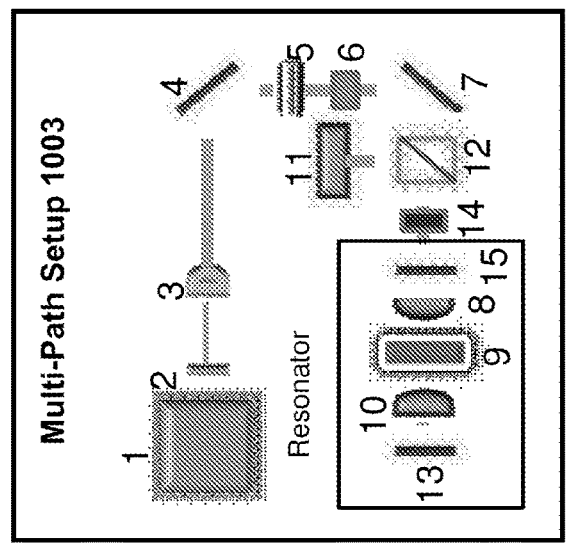
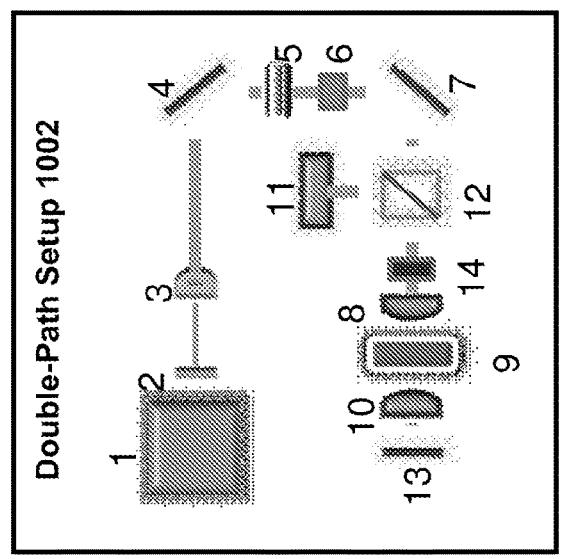
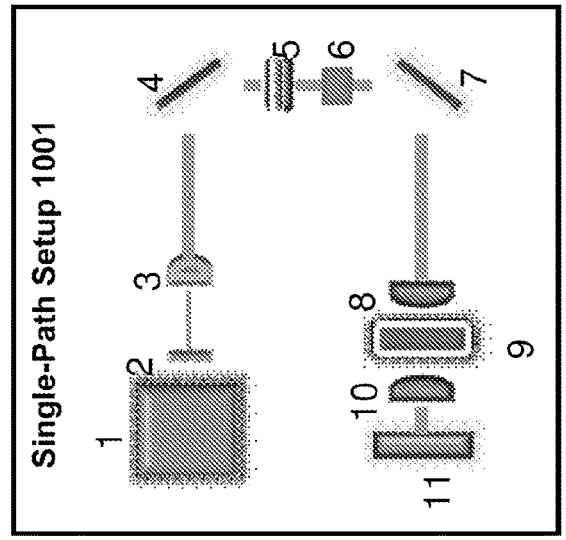
Fig. 10

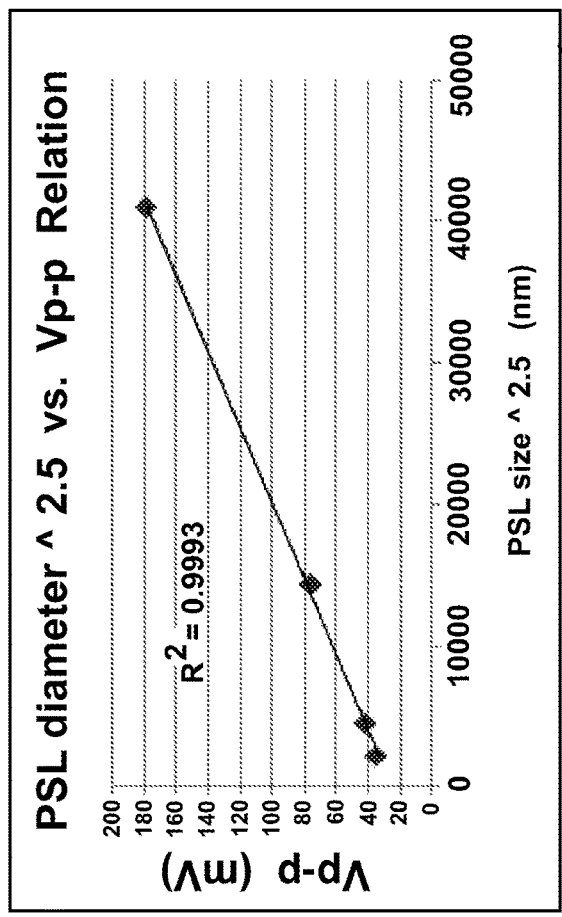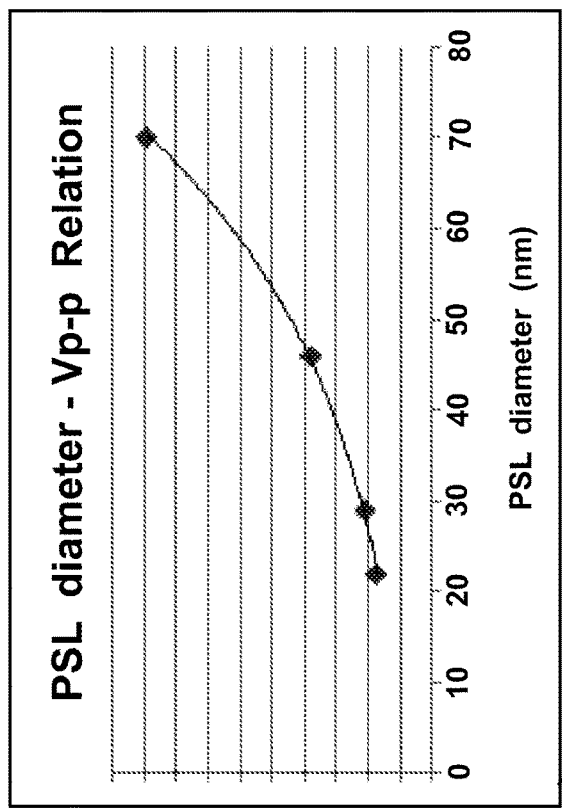
Fig. 14

SYSTEM AND METHOD FOR PARTICLES MEASUREMENT

CROSS-REFERENCE TO RELATED APPLICATIONS

This patent application is a U.S. National Stage Application filed under 35 U.S.C. § 371 of International Application No. PCT/IL2018/051141 (WO 2019/082186), filed Oct. 25, 2018, which claims priority and benefit from U.S. provisional patent application No. 62/577,403, filed on Oct. 26, 2017, each of which are hereby incorporated by reference in their entireties to the extent non-inconsistent therewith.

FIELD OF THE INVENTION

The present invention is related to the field of measuring particle size and concentration. More specifically, it relates to the use of optical methods for measuring particle size and concentration, and achieving an improved detection sensitivity or improved characterization of the measured particles.

BACKGROUND

Publications and other reference materials referred to herein are numerically referenced in the following text, and are respectively grouped in the appended Bibliography which immediately precedes the claims.

Many techniques exist for particle size and concentration analysis (PSA); and they can be reviewed for reference in the books "Introduction to Particle Size Analysis" by Terry Alan (1) and "Particle Size Analysis" by N. Stanley-Wood and Roy W. Lines (10).

The most commonly used techniques are optical, based on the interaction of the measured particles with laser radiation. Especially when approaching the particle size range around 1 micron and below, where Mie scattering prevails, most of these techniques suffer from inaccuracies due to the effect of the real and imaginary part of the particle's refractive index. It is known, for example, that in some techniques, such as techniques based on Fraunhofer diffraction analysis, light absorbing particles would be over-sized due to energy loss resulting from the absorption; while in high concentration, particles would be under-sized due to secondary scattering, etc. Additionally, the ability to detect individual nm scale particles is very limited as the signal decreases according to the radius $r^6$, posing sensitivity and dynamic range challenges.

An optical technique that is less sensitive to these problems is known as Time of Transition or TOT. In this technique, the interaction of a scanning, focused laser beam and the particles is analyzed in the time domain rather than in the amplitude domain, resulting in lower sensitivity to variation in the refractive index. A detailed description of the technique appears in a paper "Improvements in Accuracy and Speed Using the Time-of-Transition Method and Dynamic Image Analysis For Particle Sizing" by Bruce Weiner, Walter Tscharnuter, and Nir Karasikov (2). To a great extent, in this technique a digital de-convolution algorithm of the known laser beam profile from the interaction signal derives the size. The concentration is derived from the number of interactions per unit time within the known volume of the focused laser beam, using principles of digital confocality.

The interaction of the particles in the TOT technique is with a focused scanning laser beam. In order to measure smaller particles, a smaller focused spot should be used. However, according to diffraction laws for a Gaussian laser beam, if the beam's waist is D, the divergence of the beam is proportional to $\lambda/D$, where $\lambda$ is the laser's wavelength; and as a result the Raleigh range and the Depth of Focus decrease as $\lambda$ gets larger or D smaller (Depth Of Focus is $$DOF = \frac{2\pi D^2}{\lambda}\bigg).$$

The trade-off between the ability to resolve small particles, to the focus volume and the accuracy in measuring concentration, is obvious. Thus, if the TOT technique is targeted to resolve and measure particles in the sub-micron range, it would be limited in its ability to measure low concentrations as the instantaneous focus volume is small and the interaction rate of particles is low. On the other hand, taking a larger spot will improve the concentration measurement rate and its accuracy, but will degrade the quality and resolution of the size analysis.

An improvement could be achieved by using a shorter wavelength, yielding lower divergence for a given focal spot and correspondingly a longer Rayleigh range. This could have a limited effect of, as high as a factor of 2 only, since going to a too short of a wavelength will result in absorption of the laser light by the optics and, in the case of particles in liquid, also potentially absorption by the liquid.

A previous patent assigned to some of the applicants of the present application (U.S. Pat. No. 7,746,469, which is hereby incorporated by reference in its entirety) introduced a new technique and means to somewhat decouple between the two contradicting requirements: the ability to resolve small particles and the ability to measure low concentration using measurements based on single particle interactions by means of a structured laser beam.

The method introduced in U.S. Pat. No. 7,746,469 is based on a synthetic beam generation. The limitation as described hereinabove results from the inherent Gaussian beam profile of the laser beam and is somewhat addressed by the proposed synthetically generated beam where spatial resolution can be achieved in lower beam divergence. Other energy distributions could be synthetically generated and used for particles measurements. One specific reference, which describes the technique, is reference (3). This publication deals with the generation of three-dimensional light structures used in the invention. It describes the philosophy and the techniques used, and it also provides some examples. In particular, the dark beam described is of primary interest for the previous invention. Other relevant references are (4) to (9). The dark beam is a laser beam that has a dark spot or dark line singularity at the center of a beam with an otherwise typically Gaussian envelop. The main advantage of this beam for the purpose of PSA (Particle Size Analysis) originates from the fact that the dark central spot/line is narrower than a classical Gaussian spot, having the same divergence, leading to the possibility of higher sensitivity to the position and structure of an obstructing object while maintaining sufficient volume of the Gaussian beam for concentration measurement and for larger particles interactions as well. Dark beams can be generated by converting a conventional laser beam with the help of an optical element (usually a diffractive element) or by a special design of the laser resonator in such a way that it emits a dark beam. These laser modes are usually members of a set called Gauss-Laguerre and Gauss-Hermit modes.

Reference is made to FIG. 1, which is a schematic illustration of a chart 101 demonstrating the intensity curve of a Gaussian beam. The horizontal axis indicates position from the center of the beam; for example, indicate in microns or in 10^(-6) meters. The vertical axis indicates beam light intensity; for example, in relative units.

In chart 101, for example, numeral 10 indicates the shape of a beam with Gaussian profile; numeral 12 indicates the shape of a first lobe of a Dark Beam; numeral 12' indicates the shape of a second lobe of the Dark Beam; the two lobes are shifted in phase by 180 degrees, but this is not shown in chart 101 as this chart demonstrates Intensity; numeral 14 indicates the spacing between the two lobes; as the two lobes are shifted by 180 degrees, there is a singularity with zero energy between them; numeral 16 indicates the width of the beam at e A (-2) of intensity; numeral 18 indicates the spacing between the peaks of the two lobes. FIG. 1 shows a comparison of the intensity curve of a Gaussian beam 10 with that of a dark beam generated from it. The dark beam has two lobes 12 and 12', and a singularity dark line 14 between them. The double-headed arrows show, respectively: (i) as indicated by numeral 16, the maximum width≅2WO of the Gaussian beam 14, where WO is the Gaussian beam waist; and (ii) as indicated by numeral 18, the maximum width or the peak spacing which is ≅WO√2 between the peaks of the dark lobes 12 and 12'. The two lobes are phase shifted by 180 degrees.

Dark beams can be generated in such a way that they maintain a sharply-defined energy distribution over a wider depth of field, thus offering a better trade-off between size and concentration when implemented in scanning laser probe measuring technique or in TOT. Further, additional information, unavailable in a TOT, is available with the dark beam, enabling more precise measurements. A few ways to realize these forms could be considered and are covered in the references listed in the bibliography of U.S. Pat. No. 7,746,469; and those references are hereby incorporated by references in their entirety.

The optical setup described in U.S. Pat. No. 7,746,469 comprises a single forward-looking detector. The particle size is measured for small particles by the depth of modulation of the dark line, and for large particles by the width of the interaction. The optical setup also comprises a scanner. The scanning speed is much higher than the particle velocity, so the particle speed is assumed to be negligible; and therefore, the particle size can be determined from the beam speed, interaction width and modulation depth of the interaction signal, and the width of the beam.

The subject matter of patent application US 2015/0260628 (which is hereby incorporated by reference in its entirety), is a method and apparatus for particle size and concentration measuring that improves on the method described in U.S. Pat. No. 7,746,469.

Reference is made to FIG. 2, which is a schematic illustration of a system. FIG. 2 schematically shows the measurement system described in US 2015/0260628. The system shown in FIG. 2 comprises a laser 20, which generates a Gaussian beam; spherical lenses 22 and 24, which together collimate the beam and act as a beam expander 26; phase mask 28, which converts the Gaussian laser beam into a structured dark beam with a line singularity; a beam splitter 30 collecting the back scattered light; a focusing lens 32, which focuses the dark beam inside a cuvette 34 through which liquid or air containing particles 36 flow in the direction of the arrow Y; and two horizontal forward detectors 38 and 40 (for clarity, rotated to the plane of the paper). It is noted that in the case of airborne particles, the air stream bearing the particles need not necessarily be confined within a cuvette. Backscatter radiation from a particle 36 in the focus of the focusing lens 32 is collected by the focusing lens 32, inherently collimated, reflected by beam splitter 30, and directed via the collecting lens 42, which focuses the radiation through pinhole 44 onto a backscatter detector 46.

Reference is made to FIG. 3, which is a schematic illustration demonstrating positioning of detectors. The positioning of the detectors 38 and 40 with respect to the illuminating dark beam pattern is shown in FIG. 3. In FIG. 3, the Z-axis is the optical axis perpendicular to the plane of the paper; the Y-direction is the direction of particle flow perpendicular to the Z-direction in the plane of the paper; and the X-direction is perpendicular to Z also in the plane of the paper. As shown in the figure, the two detectors are located in the X-Y plane at different locations in the Y-direction parallel to the dark beam line singularity symmetrically one on each side of the dark line 14; with detector 38 positioned to cover partially intensity lobe 12; and detector 40 positioned symmetrically to cover partially intensity lobe 12' of the dark beam. Referring to FIG. 3, as particles cross the beam from top to bottom, the output intensity pattern is modified, and the detectors sense a shift in the phase. Basically, the minute scatter from a small particle crossing one lobe interacts with the second lobe in a homodyne mode. This yields higher sensitivity and additional information, as the scattering is spatially separated before detection, rather than integrated.

The detectors spacing can be optimized or modified or configured for sensitivity, by aligning it to the maximum intensity gradient of the dark beam. For various analytic purposes, the detector signals can be recorded either: (a) as separate signals; (b) as a differential signal of the two detector signals; and (c) as the sum of the two detector signals. Subtracting the signals of the two detectors eliminates common noise, such as laser noise; and thereby improves the sensitivity of the measurements over those made using the system of U.S. Pat. No. 7,746,469.

The signal detected results from the phase difference and its size dependency is typically $r^{2.5}$.

The signal dependency of $r^{2.5}$ is shown in the following table, and in the graphs 1401 and 1402 on PSL (Poly Styrene Latex) beads of FIG. 14.

| Measurement Results | | | | |
| --- | --- | --- | --- | --- |
| Flow Rate | PSL [nm] | Concentration [#/ml] | Vp-p Average [mV] | PSL Diameter ^ 2.5 |
| 250 sccm | (Background) | 0 | 26.48 | — |
| 250 sccm | 22 | 5.127 E+12 | 35.35 | 2270.2 |
| 250 sccm | 29 | 2.687 E+13 | 41.67 | 4528.9 |
| 250 sccm | 46 | 3.606 E+11 | 76.32 | 14351.4 |
| 250 sccm | 70 | 2.509 E+11 | 178.80 | 40996.3 |

The delay between the signals from the two forward detectors 38 and 40 is used to derive information on the location along the optical axis Z at which the interaction with the particle took place; and, therefore, improves the accuracy; because if the location along the direction of beam propagation is known, then the corresponding beam profile at that location is known and can yield higher accuracy in determining the particle size based on the interaction signal, de-convolving the beam profile. Alternatively, the delay can be used to reject particles that do not interact with the beam at the focus. In U.S. Pat. No. 7,746,469, rejection of measurements for particles that do not pass through the focal point of the dark beam is based on the slope of the interaction signal, which is less accurate. It requires knowledge of the relative velocity of the particle. In patent application publication US 2015/0260628, one can derive the velocity without any scanning, based on the transit time between the two lobes on the two detectors (e.g., known distance between the lobes, divided by time between signals). This typically yields a lower noise and higher sensitivity than with a scanning beam.

Backscatter detector 46 detects the backscatter from the interaction of the particle with the dark beam through pinhole 44. Because of the pinhole 44, the detection is confocal and only particles that move exactly in the focus of the dark beam will be detected by the backscatter detector 46. The signals from the backscatter detector provide additional information including: additional information on the particle size via intensity, width and modulation; reflection properties of the particle; fluorescence generated by the illuminating beam (given a suitable wavelength is chosen); and when combined with signals from the two forward detectors, may function as a high-resolution one-dimensional confocal scanning microscope, and/or can reveal information that is used to characterize specific particles and/or to classify individual particles by clustering their nature of interaction.

Another improvement of the apparatus of US 2015/0260628 is that the use of two forward detectors in the system as described eliminates the necessity of scanning, and the measurements can be carried out with a stationary beam to measure the velocity of the particle as explained above. This is achieved by measuring the velocity of particles passing in the focal zone (delay=0 between the two detectors signals), where the gap between the lobes is known. This can easily be implemented when particles are small compared with that gap, but also for larger particles, where the gap is shown as a graded signal ramp, with a plateau in the middle of the rise time and fall time.

One limitation of the methods described in U.S. Pat. No. 7,746,469 and US 2015/0260628 is that the spot size of the illuminating beam is still highly focused, and therefore the rate of interaction with the particles is low, and the methods are typically effective for relatively high particle concentrations.

SUMMARY OF THE INVENTION

It is therefore a purpose of the present invention to outline a system and method that provide accurate measurement of particle size and concentration for low concentrations of contaminants in clear liquids and gases, while maintaining the advantages of the techniques described above, and/or to facilitate size sensitivity down to the 20 nm range and below as needed in clean liquids and air in the Semiconductor and Pharmaceutical industries. It is further a purpose of the present invention to outline and explain several configurations for improved detection sensitivity down to 7 nm PSL and even below.

Further purposes and advantages of this invention will appear as the description proceeds.

The invention covers various aspects of enhancing the performance of particle detection based on interaction with a dark beam. Covered under the invention are, for example: provisions and mechanisms for detecting in low concentration; provisions and mechanisms for determining or detecting or estimating more information using several wavelengths; provisions and mechanisms for different beam profiles; provisions and mechanisms for improved sensitivity using dual and multi path detection; provisions and mechanisms for reducing noise via polarization, including provision and mechanism to create a delay between two polarizations or between two polarized components; provisions and mechanisms for more information for clustering—back scatter, multi-color interaction; provisions and mechanisms for phase and amplitude separate analysis; and/or provisions and mechanisms for detection under low Signal to Noise Ratio (SNR) using pattern recognition.

In an aspect, provided is a particle detection system comprising: i) a flow cell for flowing a fluid containing particles; ii) an optical source for generating a beam of electromagnetic radiation; iii) a beam shaping optical system for receiving the beam of electromagnetic radiation; the beam shaping optical system for generating an anamorphic beam and directing at least a portion of the anamorphic beam through the flow cell; iv) at least one optical detector array in optical communication with the flow cell and the optical source; wherein the optical source directs the beam electromagnetic radiation to the optical lens thereby generating the anamorphic beam, wherein the portion of the anamorphic beam directed through the flow cell is provided to the at least one optical detector array which measures an interaction between the portion of the anamorphic beam and particles present in the flow cell, thereby generating a plurality of individual signals corresponding to elements of the at least one optical detector array; and v) an analyzer for generating a differential signal from the individual signals indicative of the particles.

The beam shaping optical system may comprise one or more cylindrical lens. The at least one optical detector array may be positioned to receive forward propagating electromagnetic radiation.

In an aspect, provided is a particle detection system comprising: a) a flow cell for flowing a fluid containing particles; b) an optical source for generating a beam of electromagnetic radiation; c) an optical steering system in optical communication with the flow cell and the optical source, for directing the beam through the flow cell at least twice; wherein the particles in the flow cell interact with different portion of the beam on each individual pass through the flow cell; d) an optical detection system for receiving electromagnetic radiation from the flow cell on to at least one optical detector array for generating a plurality of individual signals from the interactions with the beam; and e) an analyzer for generating a differential signal from the individual signals indicative of the particles.

The optical steering system may direct the beam to pass through the flow cell at least four times, at least six times, or optionally, at least eight times. The optical steering system may comprise a half wave plate, a quarter wave plate or both for altering a polarization state of the beam.

The analyzer may analyze the differential signal in the time domain. The analyzer may count the particles base on the differential signal. The analyzer may characterize the size of the particles.

The beam of electromagnetic radiation may be a Gaussian beam, a non-Gaussian beam, a structured non-Gaussian beam, a dark beam, or a structured, dark beam. The anamorphic beam may be a top hat beam, Gaussian beam or a structured, dark beam.

The particle detection systems and methods described herein may further comprise at least one backscatter detector in optical communication with the flow cell. the backscatter detector may detect reflectivity of the particles. The backscatter detector may detect fluorescence of the particles. The backscatter detector may be used to determine if the particle is biological or non-biological.

The at least one optical detector array may be a segmented linear detector array. The differential signal may be generated by particle detection system in analog.

The particle detection system and methods described herein may further comprise a processor. The differential signal may be generated by the processor. The processor may compare each output differential signal with a pre-generated library of known signals corresponding to particles to determine if each output signal corresponds to a particle detection event or laser noise. The processor may convert each output differential signal to the frequency domain using a Fourier transformation or a fast Fourier transformation.

In an aspect, provided is a method for detecting particles comprising: i) providing at least one optical detector array in optical communication with a flow cell; ii) generating one or more beams of electromagnetic radiation; iii) shaping the one or more beams of electromagnetic radiation using a beam shaping optical system to generate an anamorphic beam and such that at least a portion of the anamorphic beam is directed through the flow cell and provided on to the at least one optical detector array; iv) flowing a fluid through the flow cell, thereby generating interactions between the anamorphic beam and the particles present in the fluid; v) detecting interactions with the particles and the anamorphic beam in the flow cell using the at least one optical detector array, thereby generating detector output signals corresponding to elements of the at least one optical detector array; vi) generating a differential signal based on two or more of the detector output signals; and vii) analyzing the differential signal to detect and/or determine one or more characteristics of the particles.

In an aspect, provided is a method for detecting particles comprising: i) providing at least one optical detector array and a flow cell for flowing particles; ii) generating at least one beam of electromagnetic radiation and directing the beam to an optical steering system; iii) directing the beam using the optical steering system such that the beam passes through the flow cell at least twice; iv) flowing a fluid through the flow cell, thereby generating interactions between the beam and the particles in the fluid, wherein interactions between the particles and the beam occur in a different portion of the beam on each individual pass; v) directing the beam on to at least one optical detector array for generating a plurality of detector signals from the interactions between the particles and the beam; vi) generating a differential signal based on the plurality of detector signals; vii) analyzing the differential signal to detect and/or determine one or more characteristic of the particles.

The step of analyzing the differential signals may be performed in the time domain. The beam of electromagnetic radiation may be a Gaussian beam, a non-Gaussian beam, a structured non-Gaussian beam, a dark beam, or a structured, dark beam. The anamorphic beam may be a top hat beam, Gaussian beam or a structured, dark beam.

The beam shaping optical system may comprise one or more cylindrical lens. The at least one optical detector arrays may be a segmented linear detector array.

The step of analyzing the differential signal may include comparing the differential signal with a pre-generated library of known signals corresponding to particles and determines if the differential signal corresponds to a particle detection event or laser noise. The step of analyzing the differential signal may include converting the differential signal into the frequency domain using a Fourier transform or a fast Fourier Transform. The step of analyzing the differential signal may include characterizing the particles, for example, counting the particles, determining the size of the particles, or both.

Additionally, the additional embodiments and systems described herein may be usefully incorporated in the described methods.

"Anamorphic beam," as used herein, refers to a beam of electromagnetic radiation characterized by independent optical power in more than one spatial dimension. An anamorphic beam may have different optical power in more than one spatial dimension. An anamorphic beam may have independent and different optical power in two spatial dimensions corresponding to the cross-sectional area of the flow cell (e.g. the x-y plane which the particles pass through if flowing in the z direction).

"Optical detector array" refers to a group or array of individual detector elements, for example, a one-dimensional or two-dimensional array of photodetectors or photodiodes.

All the above and other characteristics and advantages of the invention will be further understood through the following illustrative and non-limitative description of embodiments thereof, with reference to the appended drawings.

BRIEF DESCRIPTION OF THE DRAWINGS

FIG. 5 shows schematically the two lobes of the beam at the detection plane which is partially covered by a dual detector array, in accordance with the present invention, and wherein in the array, each pair functions as detectors 38 and 40 of FIG. 3.

FIG. 7 schematically shows the scanning direction used with the optical setup of FIG. 6, in accordance with the present invention.

FIG. 10 shows schematically the Single-path detection scheme and the improved Dual-path and Multi-path detection schemes, in accordance with the present invention.

FIG. 14 shows schematic illustrations of two graphs demonstrating signal dependency, in accordance with the present invention.

DETAILED DESCRIPTION OF SOME EMBODIMENTS OF THE INVENTION

Figure 1:
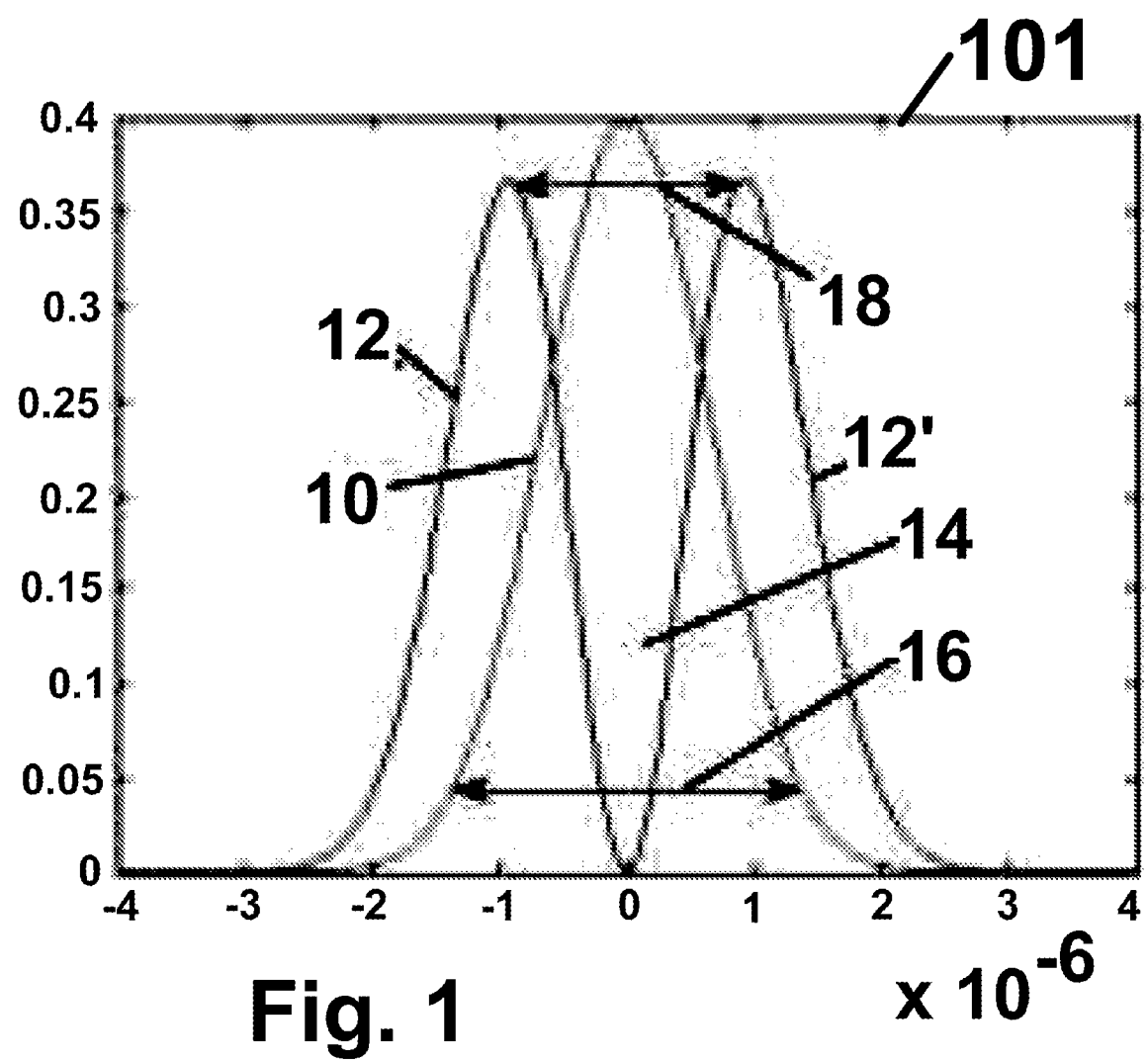
FIG. 1 shows two-dimensional intensity profiles of a Gaussian beam and a dark beam.
Figure 2:
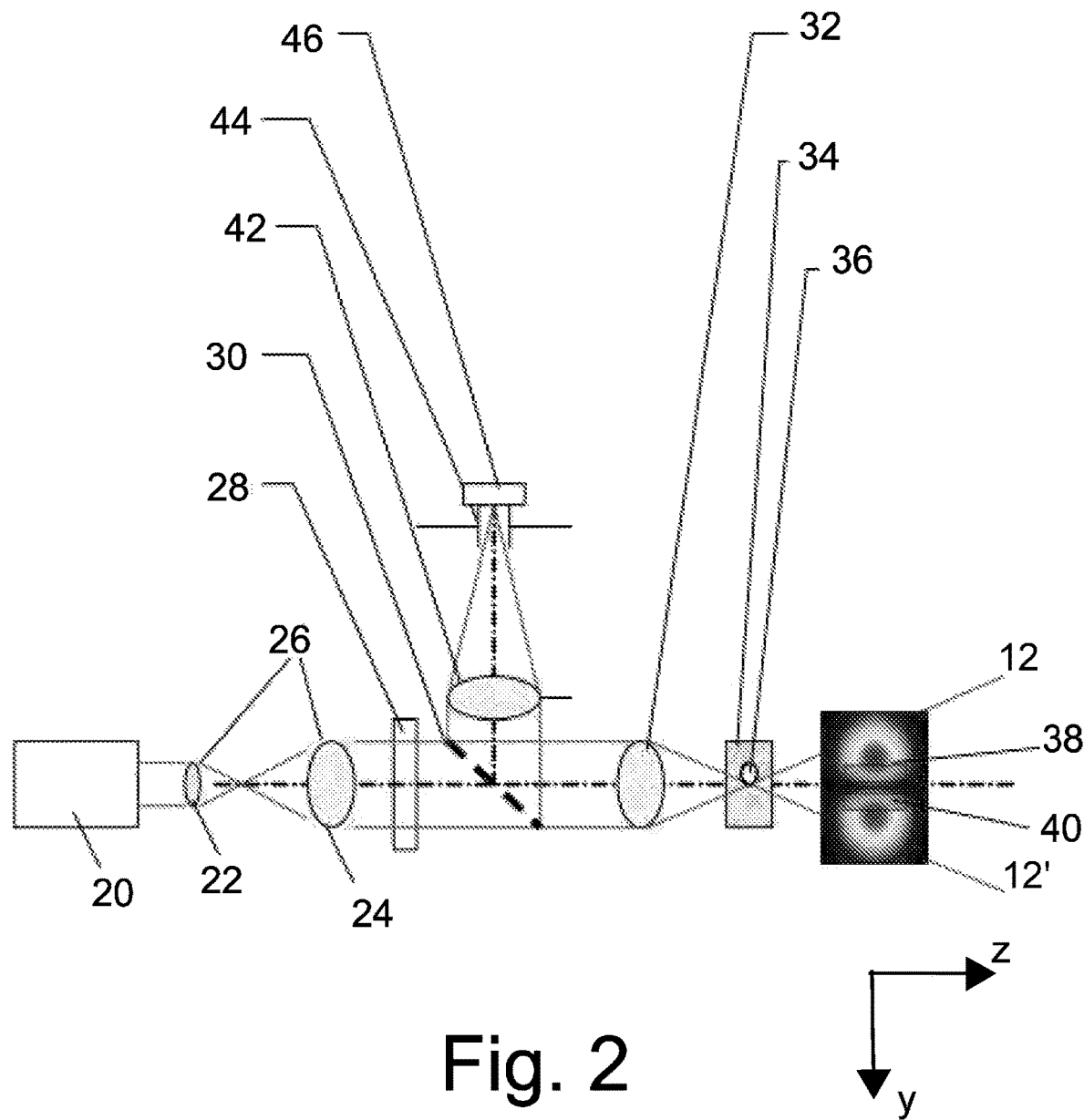
FIG. 2 schematically shows a prior art particle monitoring system.
Figure 3:
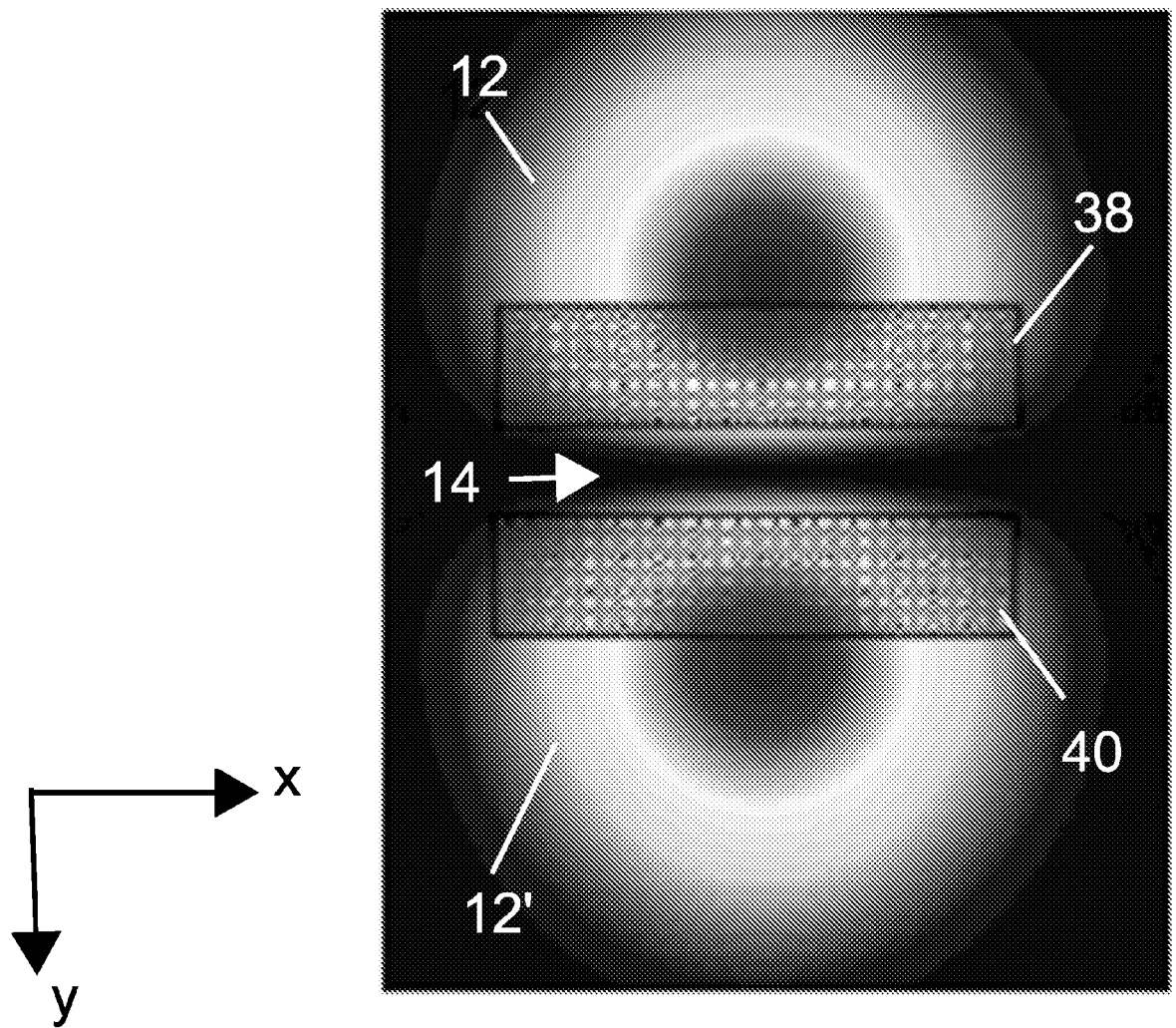
FIG. 3 schematically shows the positions in the detector plane of the forward detectors of the system of FIG. 2 with respect to the illuminating dark beam pattern.
Figure 8A:
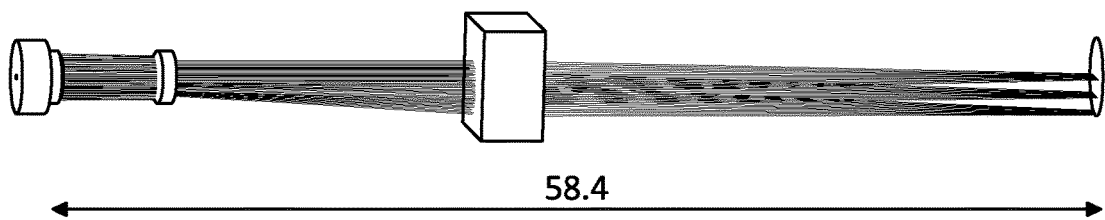
FIGS. 8A, 8B and 8C schematically illustrate the collecting optics with a line focus, having Fourier Transform (FT) in Y direction and imaging in the X direction, in accordance with the present invention.
Figure 8B:
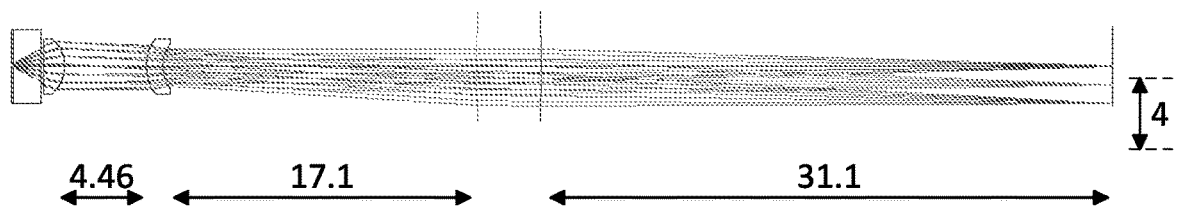
Figure 8C:
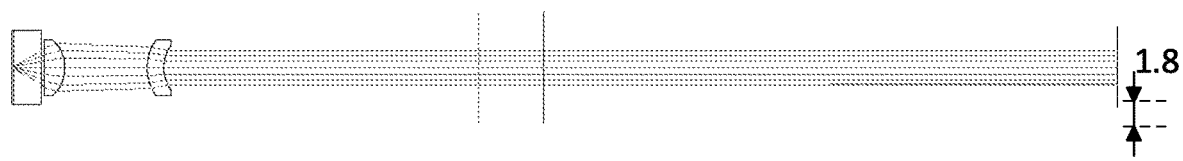

In order to improve sensitivity of the measurements for low concentrations of contaminants in clear liquids or gases, the inventors have modified the optical system of FIG. 2 by inter alia changing lens 32 from a spherical to a cylindrical lens. The optical energy distribution in the present invention, an embodiment of which is schematically shown in FIG. 5, comprises a line focus with a dark line singularity. Other optical designs to achieve a higher level of anamorphic beam profile are part of the present invention, including top hat line distribution in X direction. The focused beam interacts with particles, same as explained above for a circular focus, and then projected on to a detector array and thus achieves parallel detection by multiple detector pairs in the form illustrated and explained above on FIG. 3. An additional cylindrical collecting optics, shown schematically in FIG. 4, could be used between the focal zone and the detector to match the beam profile to the detector size. The lens can be used, for example, to create imaging in X direction and Fourier Transform in the Y direction. An example of such a lens design is shown schematically in FIG. 8A; further showing in FIG. 8B the imaging in X direction on a detector of 4 mm; and further showing in FIG. 8C the Fourier Transform in the Y direction.

Figure 4:
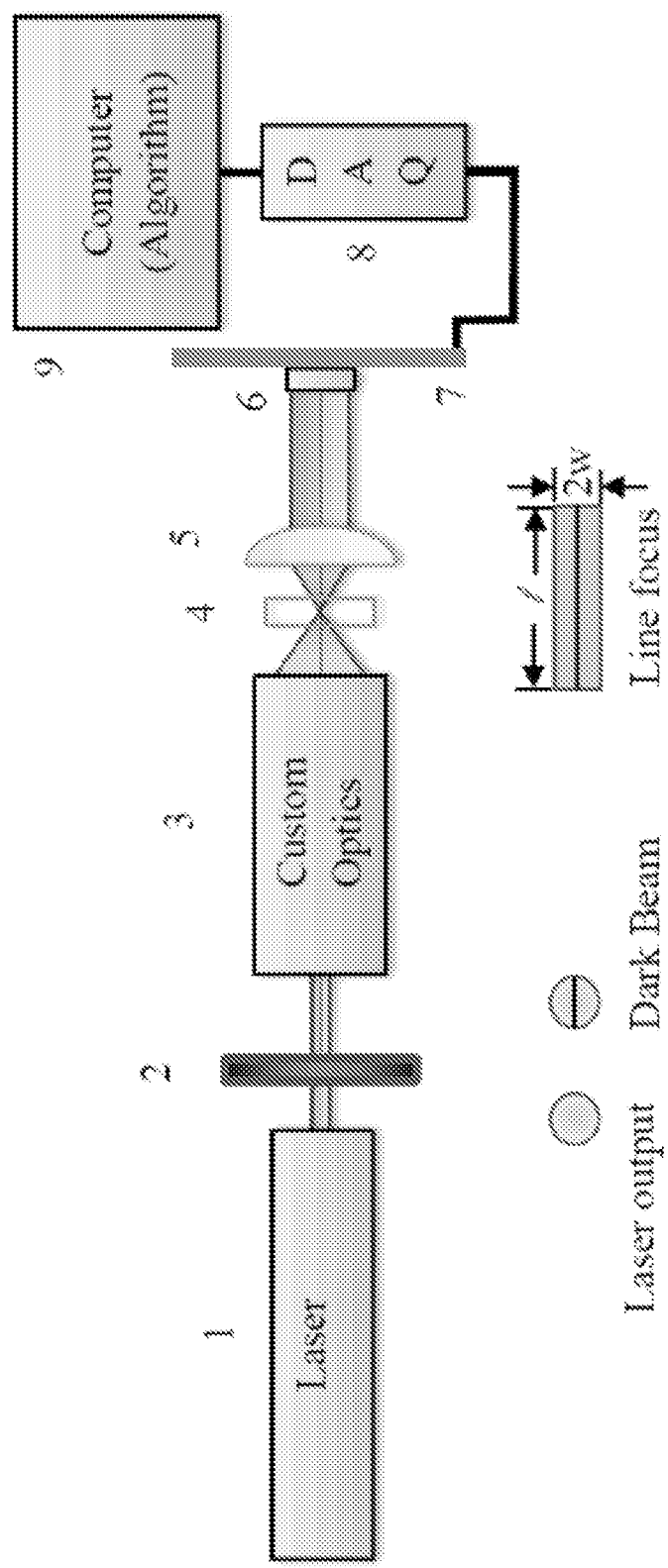
FIG. 4 schematically shows an embodiment of the particle monitoring system of the present invention, where the focal zone is elongated and a collecting optics projects the lobes on the detector array, that is then connected to a DAQ (Data Acquisition board or sub-system).

As a result of this, if, as in FIG. 2, in FIG. 4 the Z-axis is the optical axis in the plane of the paper, the Y-axis is the direction of particle flow perpendicular to the Z-direction also in the plane of the paper, and the X-direction is perpendicular to the plane of the paper, then the focus of the illuminating beam at the location of the interaction with the particles is very sharp in the Y-direction and a relatively very elongated line in the X-direction ideally with a top hat distribution [Optical design to achieve flat energy distribution in a preferred direction] along the X direction, which is the direction of the dark line singularity. Illustrative but not limiting dimensions for the focus that were used in a system built and tested by the inventors are: 1 micron dark beam in the Y-direction, and 120 microns top hat in the X-direction. In the specific embodiment of the system that has been built and used by the inventors to test the method, the detector array comprised 32 pairs of Si PIN photodiode detector elements. Thus, for the forward detectors, each pair of elements imaged 120/32≈4 microns.

In the X-direction, the detector sees an image of the beam and, for the exemplary embodiment described above in which the detector array is 4 mm long, the 120 micron width of the focal zone is magnified to 4 mm. In the Y-direction, the forward scatter detectors of FIG. 3, or the back detectors of FIG. 6 (see herein below), see the Fourier transform (Far Field) of the beam.

It is possible to extend the focus in this way in the direction without affecting the spatial resolution in the Y direction, because the particles are flowing in the Y-direction and therefore interact with only the narrow side of the beam.

There is a significant challenge of SNR and contrast when trying to detect a 10-20 nanometer particles in a 120×1 micron focal area, even based on the singularity and homodyne approach mentioned in U.S. Pat. No. 7,746,469 and US 2015/0260628. To overcome this problem in the present invention, the two forward horizontal detectors 38 and 40 shown in FIG. 2 are replaced by two segmented matched linear arrays of detectors 38* and 40* in the system shown in FIG. 5.

FIG. 5 symbolically shows the position of the detector arrays 38* and 40* relative to the dark line 14 and peak intensity regions of the two lobes 12 and 12' of a dark beam in the detector plane. The measurements are carried out using signals from corresponding pairs of detector elements across the dark line (for example, 1a and 1b in FIG. 5). This way, parallel detection is facilitated on the pairs in the array, while maintaining the same spatial resolution; and, as long as the laser power density in the focal zone is the similar to the one in FIG. 2, the same SNR is achieved. The rate of interaction of the focused beam is thus increased typically by a factor equivalent to the number of detector pairs.

The backscatter detector 46 shown in FIG. 2, in the case of the new invention, can be extended to a detector 46*, which can be either a single detector such as backscatter detector 46 in the prior art system, but it is advantageous to use two detectors 46*a and 46*b in order to be able to measure the differential signals and thereby reduce the effect of random noise. In this embodiment of the system, the two detectors 46*a and 46*b that may be incorporated into a system such as that of FIG. 2, can be either just a single detector or dual detector, of high sensitivity detector such as a PMT or APD, covering the image of the line focus. The back scatter is in dark field, hence there is typically no need for an array of detectors to reduce the background shot noise. Still, segmented linear arrays similar to forward detectors 38* and 40* can be considered for other benefits, such as a continuous area or flow mapping with high sensitivity, and/or for improved detection rate and clustering as with the forward detector array.

Figure 6:
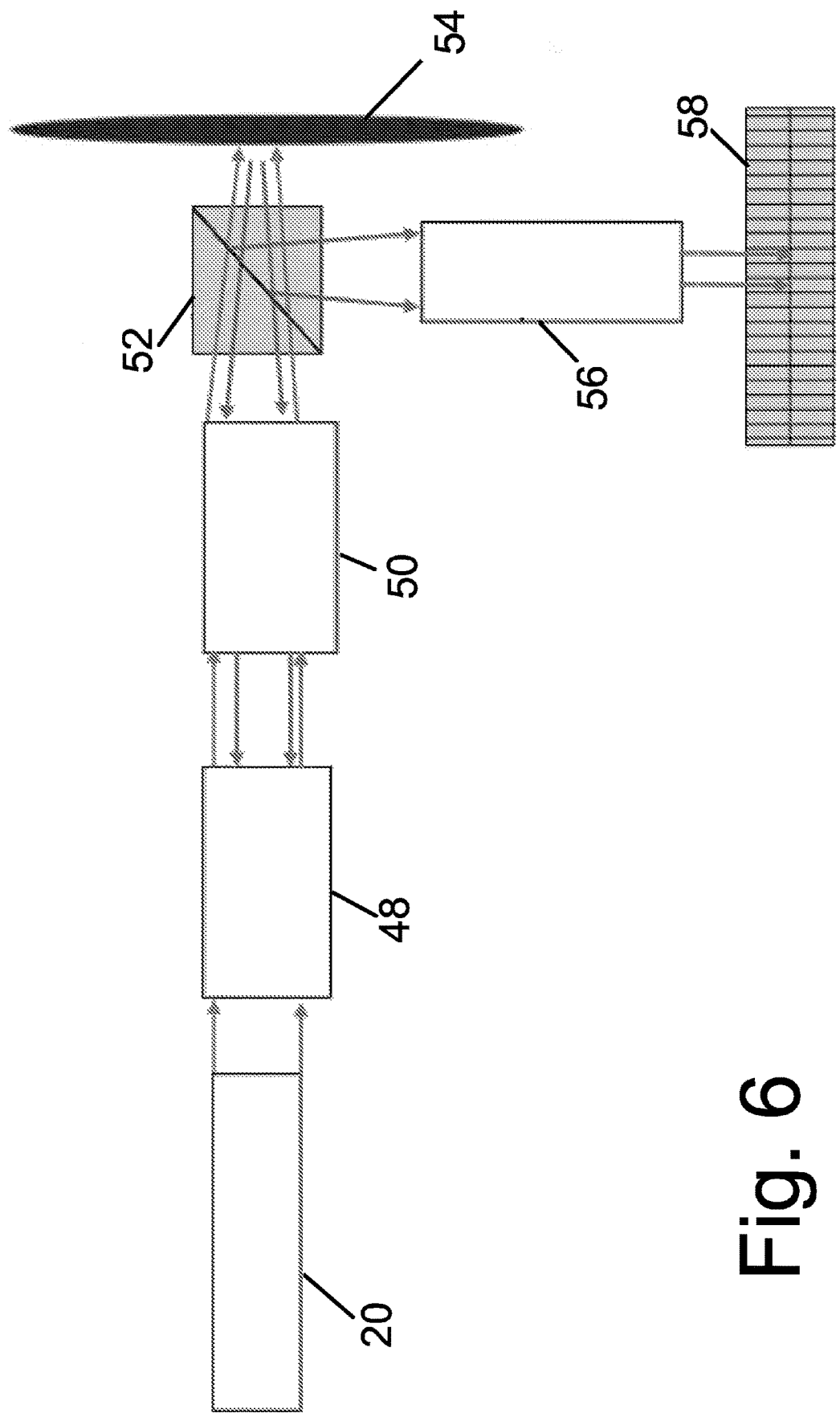
FIG. 6 schematically shows an embodiment of an optical setup for detecting and measuring the size and concentration of small particles on the surface of a wafer or on other surface, in accordance with the present invention.

FIG. 6 shows a special embodiment where the particles are on the surface of a Si wafer. The wafer is reflective, and hence the detector array 58 is position-wise equivalent to the forward scatter where the beam is reflected back, passing twice through the particle. The detector array 58 in this configuration measures the sum of the forward scattering reflected from the wafer, after passing twice through the particle, and the backscatter. Using a line focus and segmented linear array detectors to measure the backwards beam, as mentioned above, is especially useful for low concentrations of particles, as the coverage area with a line focus is bigger. Typically, a whole wafer coverage to detect 10 nm particles or smaller, can be accomplished in a few minutes, complying with the rate of 10-20 wafers per hour, while achieving superior resolution. An example of an embodiment is a top hat width of 0.5 mm and a scanning speed of the wafer relative to the beam of 1 m/sec. This yields a detection area of 500 mm^2/sec; and for a 300 mm wafer, a full coverage would be in less than 3 minutes.

DAQ:

In order to handle the output from the detectors, a dedicated data acquisition system (DAQ) and algorithms were developed by the inventors. The output of each photodiode is fed into one of the 64 input channels of the DAQ, which comprises inter alia a low noise preamplifier, components to provide a triggered output, buffers, and an interface board between the two detectors in each pair to allow for multiplexing of the output signals or transferring of distinct events.

In one embodiment, for example, the DAQ system comprises four boards, and utilizes algorithms of smart sequencing of the detector elements and their connections to the DAQ, where detectors 1, 2, 3, 4 are channeled to different acquisition boards, and then channels 5, 6, 7, 8 are channeled to the same acquisition boards. Typically, the thresholding is done in the DAQ, and only packets of configurable duration before and after the threshold triggered event are transferred to a computer or processor for further processing. Each packet is accompanied by an accurate time-stamp, so the concentration of events can be calculated based on the number of interaction and the known zone/volume of interaction. This approach is beneficial in low concentration, where rarely more than one of 4 adjacent detector pairs will encounter interaction. This topology of the DAQ is such that, for example, if a large particle passes a detector and causes a signal to be generated by up to four adjacent pairs of detector elements, the data acquisition is split so that the signal from the 1st pair of elements goes to channel 1, the signal from the 2nd pair goes to channel 2, the signal from the 3rd pair goes to channel 3, the signal from the 4th pair goes to channel 4, the signal from the 5th pair again goes to channel 1, the signal from the 6th pair again goes to channel 2, etc. In this way, information can be gathered on larger particles whose interaction is recorded in several channels with close time-stamps.

The data transferred to an external processor or computer for further processing is efficient and includes only interaction information. The majority of the time in low concentration, there will be no interaction, and no data will pass the threshold to be transferred to the processor. The concentration limit is so that two particles either cannot statistically pass in front of the detectors at the same time, or that the algorithm is able to detect this and ignore measurements of all but single particle detections.

In cases of higher concentration, the strategy is to transfer all the data to the external processor for analysis, as most of the time there will be interaction signals. An embodiment related to detection in high concentration is of a differential pre-amplifier subtracting between the two detectors in each pair. This embodiment allows initial thresholding of the interaction signals. This is relevant, for example, in case the large tail of the particles is to be detected, such as in CMP applications (Chemical Mechanical Polishing slurries). In this case, the interactions can be optically filtered by the interaction intensity, to eliminate huge amount of small particles interactions.

Another advantage of the differential signal is the rejection of common noise, allowing even lower thresholding level and hence improving the sensitivity to small particles.

Of course, all the DAQ advanced capabilities mentioned above, are applicable on the differential signal, allowing further processing.

Figure 15:
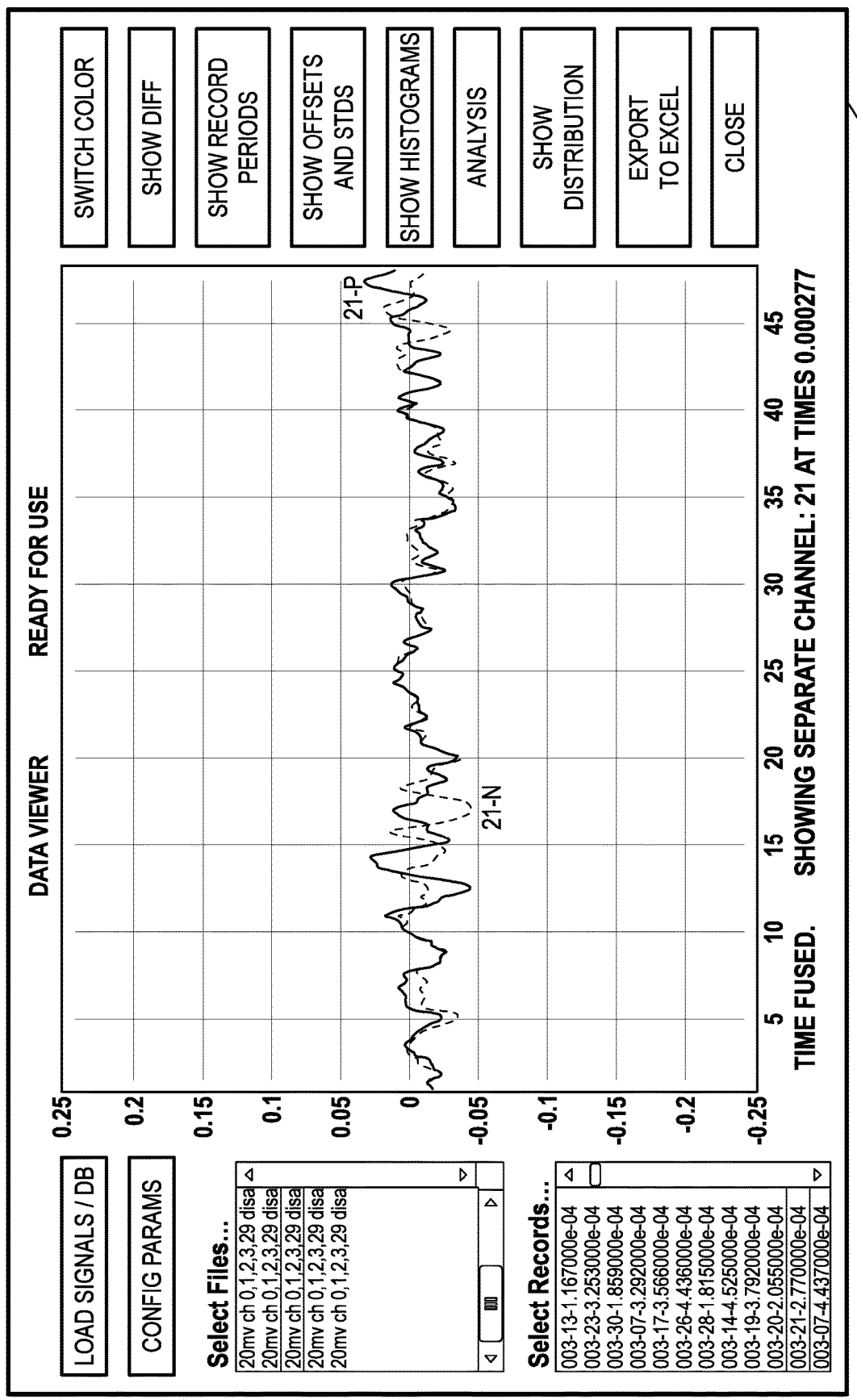
FIG. 15 demonstrates an example of the interaction detected on one channel, in accordance with the present invention.

The signal identification algorithm can determine particle size, type, and concentration. A description of the algorithm is as follows:

Pattern Matching for Low SNR:

FIG. 15 demonstrates an example 1501 of the interaction detected on one of the channels.

One can see that Positive and Negative channels (Positive and Negative channels are the reads from the two detectors in a single pair at the PDA) have certain relative structure.

Figure 16:
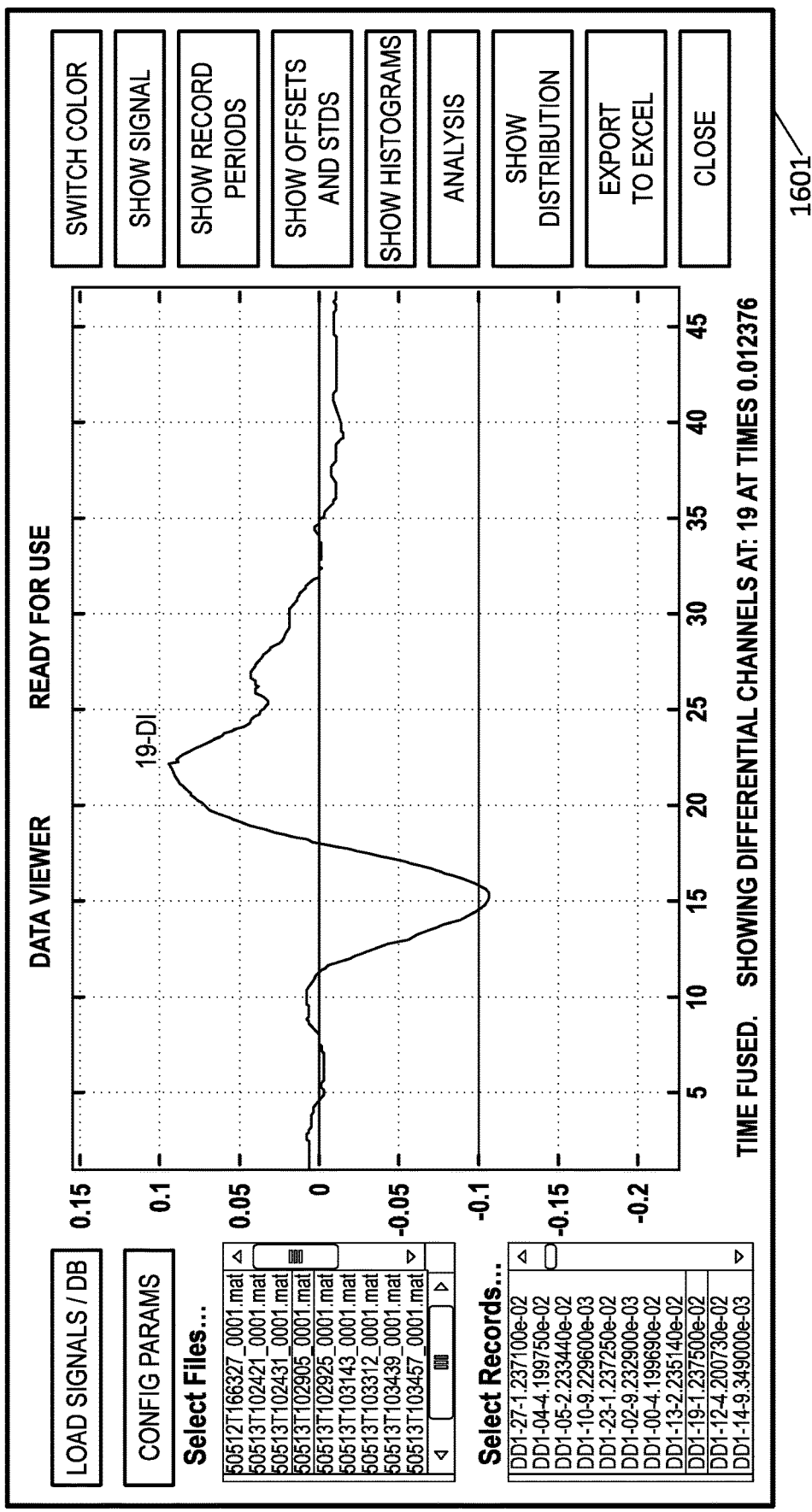
FIG. 16 demonstrates an example of a differential signal, demonstrating the difference between top and bottom PDA elements, in accordance with the present invention.

FIG. 16 demonstrates an example 1601 of the differential signal, which is their difference; for example, demonstrating the difference between the top and bottom PDA elements.

The differential signal is less noisy than the two detected channels (Positive and Negative). In order to detect similar signal in lower SNR conditions, the inventors used pattern recognition based on matched filters and performed a convolution of the differential signal against bank of filters:

$$y_k(t) = x(t) * h_k(t)$$

where x(t) is a differential signal; hk(t) is a specific matching filter; and yk(t) is an output. All filters hk(t) are normalized to unit energy.

Since the shape of the signal x(t) depends on the beam structure, particle size and interaction location in XYZ space relative to the focus, we create large number of matching filters hk(t), that can be replaced in the future in case of different interactions.

Figure 17:
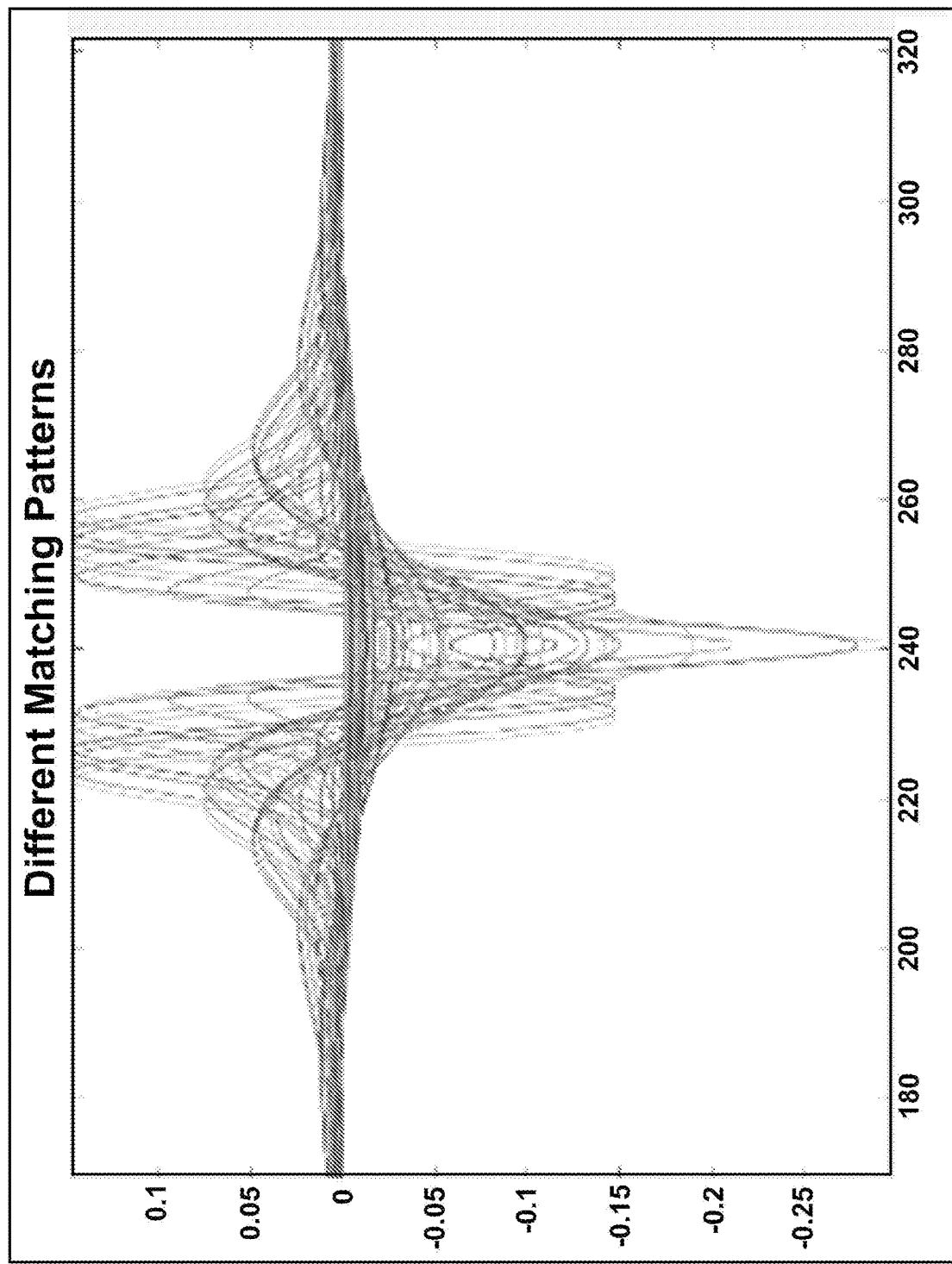
FIG. 17 demonstrates matching pattern shapes as detected by an algorithm in accordance with the present invention.

In order to detect different signals, variable delay and width of matching filters is used, as demonstrated in example 1701 of FIG. 17, demonstrating matching pattern shapes in the algorithm.

Actually, the filter bank serves a non-orthogonal basis, which spans signal subspace. The main ideas are outlined in papers related to sparse signal representations. A relevant review is the publication by Alfred M. Bruckstein, David L. Donoho, Michael Elad: "From Sparse Solutions of Systems of Equations to Sparse Modeling of Signals and Images", SIAM Review (2009)—Society for Industrial and Applied Mathematics, Volume 51, Number 1, pages 34-81, which is hereby incorporated by reference in its entirety.

The invention may represent each sensor response by the derivative of the Gaussian function, such as:

$$f_{\sigma,m}(t) = \frac{d}{dt} e^{-\left(\frac{t-m}{\sigma}\right)^2} \cong -2\left(\frac{t-m}{\sigma}\right) e^{-\left(\frac{t-m}{\sigma}\right)^2}$$

where amplitude values are ignored.

Since there are two lobes interacting with each other, the total filter response h(t) is:

$$h_{\sigma,m}(t) = f_{\sigma,m}(t) - f_{-\sigma,m}(t) \cong -\left(\frac{t-m}{\sigma}\right) e^{-\left(\frac{t-m}{\sigma}\right)^2} + \left(\frac{t+m}{\sigma}\right) e^{-\left(\frac{t+m}{\sigma}\right)^2}$$

where it is assumed that the lobes are symmetric around zero and their mean response are fm(t) and f−m(t).

Figure 18:
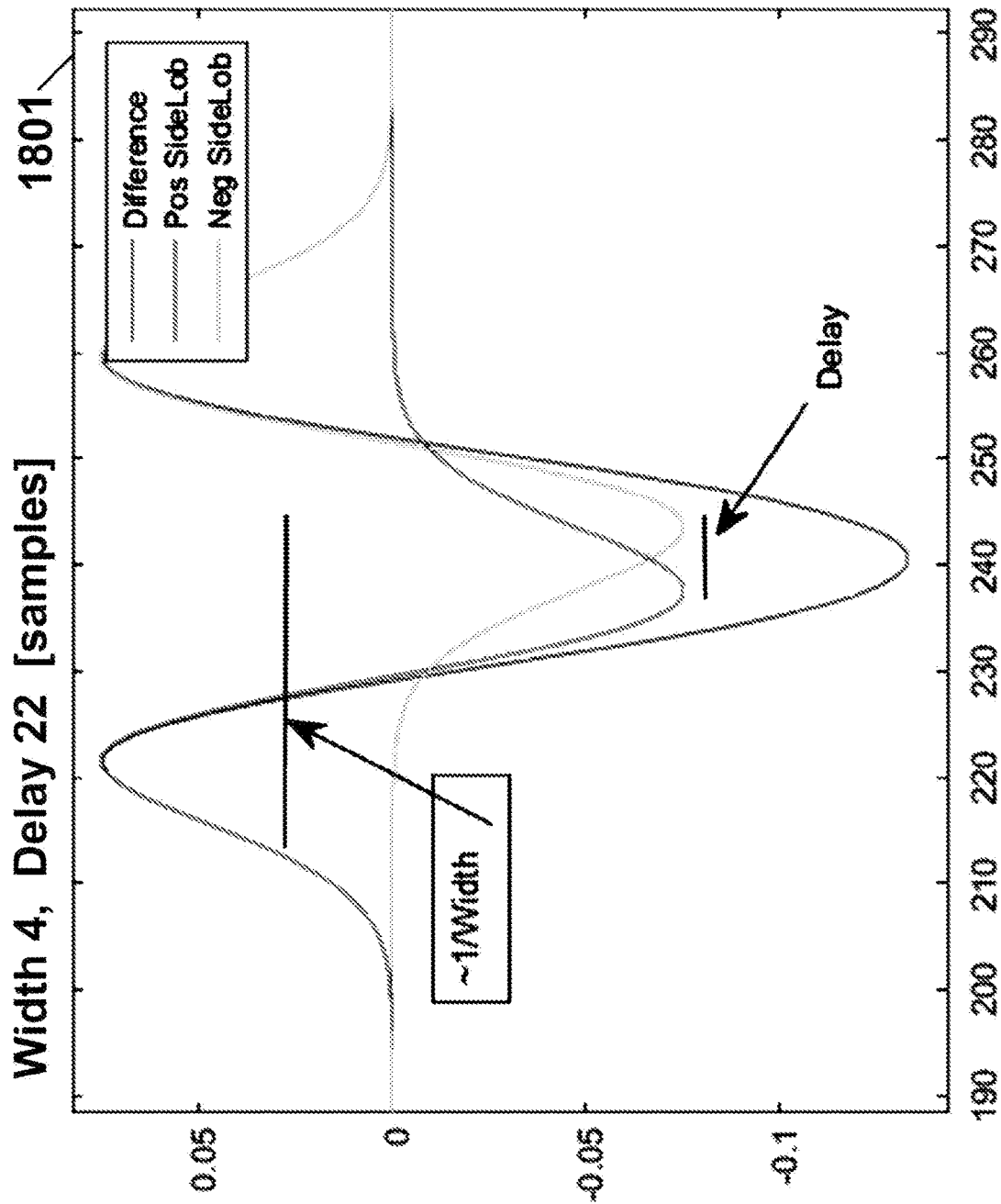
FIG. 18 demonstrates filter parameters in accordance with the present invention.

Since the interaction can happen in any place on the Z axis, the algorithm copes with different m and σ, which are called delay and width parameters respectively. In order to detect from unknown Z distance, a set of filters hk(t) is generated; where k describes a certain pair {mk, σk}. Each filter is designed with certain delay and width parameter for Positive and Negative data channels as explained and demonstrated in example 1801 of FIG. 18, demonstrating filter parameters.

The absolute value of each output signal yk(t) is computed, and the maximal is compared with threshold (e.g., can be set by the Analysis software). The parameters of the filter that created maximal response above the threshold are used as indicators for delay and width. Amplitude is taken from the maximal yk(t).

Figure 19:
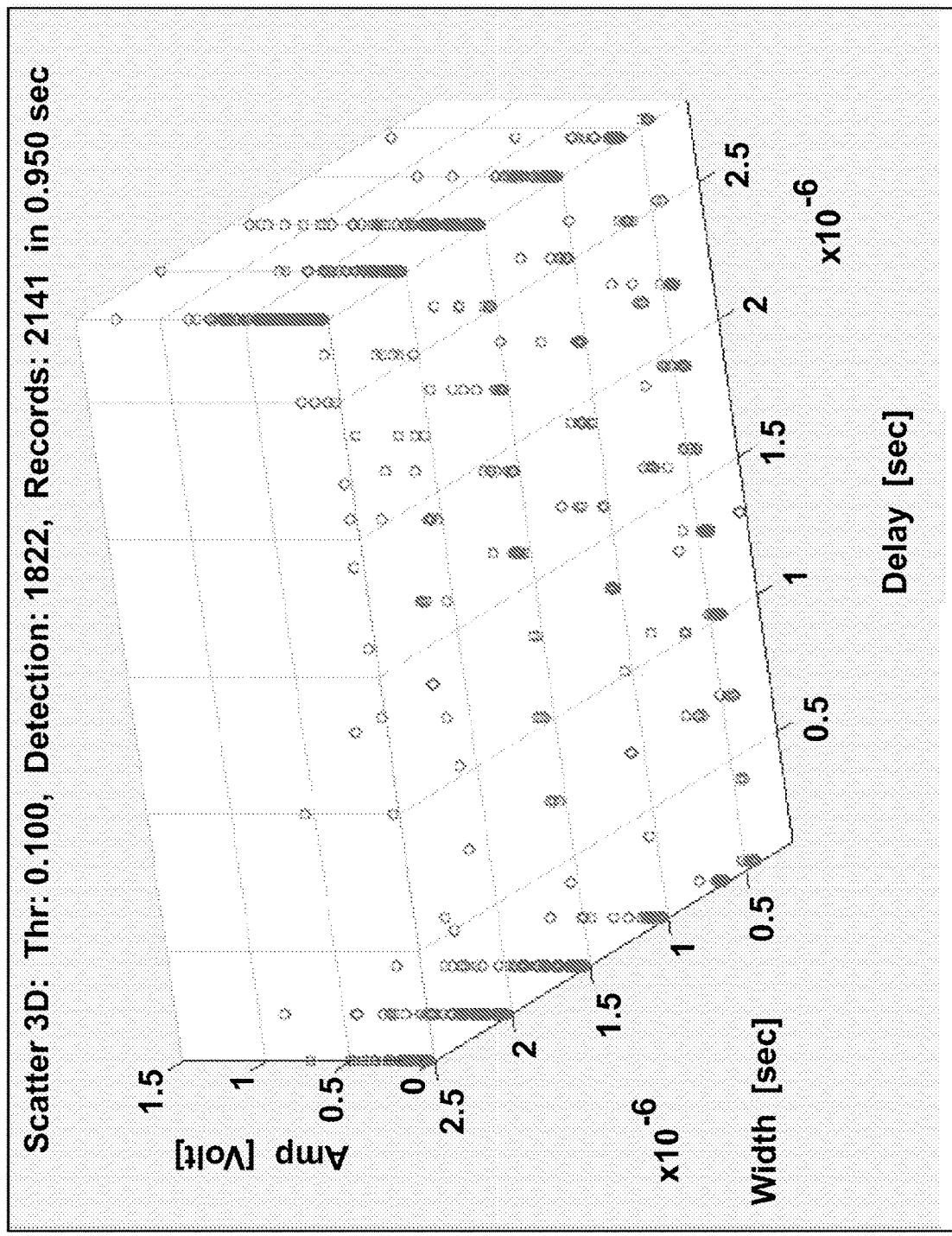
FIG. 19 demonstrates an interaction scattering plot, generated in accordance with the present invention.

Based on best matching filter parameters for all interactions, a histogram is computed or generated; such as, example 1901 of FIG. 19, demonstrating an interaction scattering plot.

The method of the invention is suitable for measuring airborne and liquid-borne samples, and has been successfully tested by the inventors for both cases. An experimental setup used electro spray to generate nano particles. Results were as described in the following table:

| Flow Rate | PSL [nm] | Vp-p Average [mV] |
| --- | --- | --- |
| 1500 sccm | 20 | (N/A, hard to get) |
| 1500 sccm | 46 | 163.6667 |
| 1500 sccm | 80 | 356.3333 |
| 1500 sccm | 100 | 582.6667 |

Some examples of applications in which the method of the present invention can be used are: to monitor the quality of ultra-pure water or other liquids in the pharmaceutical and semiconductor industries, and the environment air in a clean room. It is noted that in the case of airborne particles, the air stream carrying the particles can be (but need not necessarily be) confined within a cuvette, and the particles velocity can be determined by intrinsic interaction information, as explained above.

In addition to measurements of airborne and liquid-borne particles, the system and method of the present invention can be used to detect and measure size and concentration of small particles on surfaces. An illustrative example of an application of the method to such measurements can be found in the semiconductor industry, where it is extremely important to detect and identify the presence, concentration, and size of dust and other microscopic particles on the surfaces of bare wafers to be used as substrates in fabrication processes, or on reticles.

FIG. 6 schematically shows an embodiment of an optical setup for detecting and measuring the size and concentration of small particles on the surface of a wafer 54. Light emitted by laser 20 passes through beam isolator 48, focusing optics 50 with or without a provision to generate the dark line singularity, and beam splitter 52 to wafer 54. The light reflected from the surface of wafer 54 is split by the beam splitter 52 into two portions. The first portion passes through focusing lens 50, and is absorbed by beam isolator 48. The second portion of the reflected light passes through collecting optics 56, and is detected by forward looking segmented linear detector array 58. The light signal from the detector is comprised of the reflected forward scatter and the backscatter, as explained above. FIG. 6 shows only the elements necessary to illustrate this application of the method. Not shown are the optical elements used to form the dark beam or the linear focus. Detector array 58 comprises two detector arrays (Dual Array), for example, as in FIG. 4 and FIG. 5.

FIG. 7 schematically shows the scanning direction used with the optical setup of FIG. 6. The Z-axis is the incoming optical axis; the X-axis is the dark beam direction; the Y-axis is the scanning direction. The wafer 54 is located on an X-Y scanning stage. An optional Tip Tilt Z stage can be used, to assure that the imaged section of the wafer is in focus. The methodology and the focus feedback sensor may be implemented based on common practices as known in the motion industry.

During a scan, the wafer 54 is moved in the Y direction, so that effectively the (stationary) dark beam 60 moves over the surface of wafer 54 in the direction of the arrow. To cover the entire surface of the wafer, Raster, Meander, or other scanning pattern can be applied. In fact, as the position of the array is known via the close loop control of the scanning stage, an image or map of the contaminations can be created.

The methods described in U.S. Pat. No. 7,746,469, in US 2015/0260628, and in the present patent application, can be carried out with many modifications and improvements; such as those described as follows.

(1) Use of Other Beam Profiles:

Although the method has been described using a dark beam to interact with the particles, it can be carried out using the same optical setup mutatis mutandis with other non-Gaussian structured beams or with a Gaussian beam. When using a dark beam, the background signal is lower, and correspondingly the background shot noise is lower; however, the spot size for a Gaussian beam is smaller for a given numerical aperture, and therefore the interaction signal could be higher in some configurations. Thus, in some cases, the Gaussian beam can yield a better signal-to-noise ratio (SNR).

Investigation has shown that Dark Beam becomes very effective with an optimal photodiode detector, power and spot size. Dark Beam must be sized such that the detector receives 50% of each lobe of the beam. In order to benefit from the Dark Beam, the signal must be strong enough (irradiance) to not be limited by detector noise/DAQ resolution. Divergence of the beam requires more laser power.

Analysis of Gold vs. PSL, and Dark Beam vs. Gaussian Beam:

Gold vs. PSL: the data suggests that the signal created by the PSL is mostly due to a phase enhancement, while the signal that is created by the gold has also a strong component of obscuration.

Experimenting Dark Beam vs. Gaussian Beam: the interaction signal with the Dark Beam is stronger by 2.66 compared with the interaction with the Gaussian Beam.

(2) Use of Multiple Wavelengths:

Instead of using one illuminating laser as described above, an embodiment of the optical system comprises two or more illuminating lasers, each one having a different wavelength. They all have the same focal zone, and share some of their measurement cross-section. Therefore, by rapidly switching between them, and by synchronizing the detection to the switching rate, it is possible not only to detect when a nanoparticle passes through the beam, but also to better characterize what type of particle it is, based on the additional spectral information.

Figure 9:
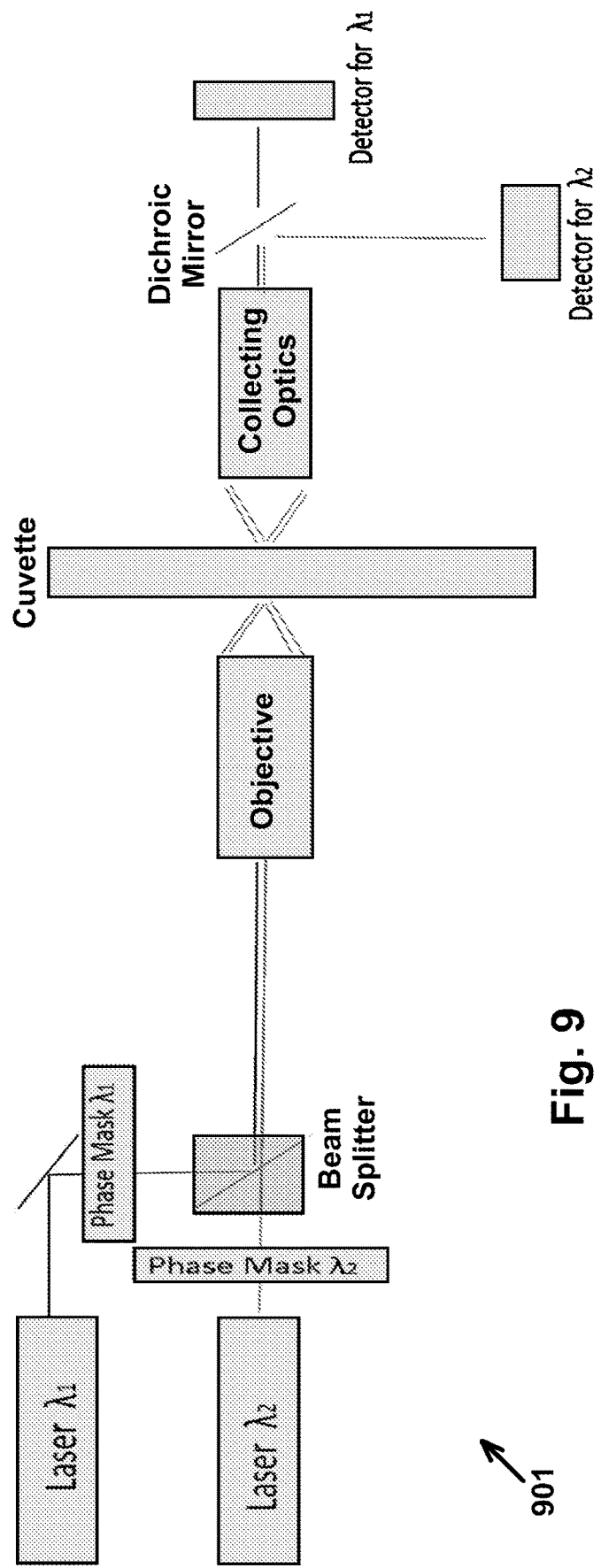
FIG. 9 is a schematic illustration of a system implementing a modified setup based on the method of US 2015/0260628 with two wavelengths, or with a plurality of wavelengths, in accordance with the present invention.

Another embodiment of this multi wavelength method and system uses a dichroic beam splitter and two detectors, so switching between the lasers is not required, getting both wavelength signals in parallel. Expanding our Dark Beam measuring method, to two Dark beams, with different wavelengths ($\lambda 1$, $\lambda 2$), that are directed along the same optical path and focused to the cuvette center, as shown in system 901 of FIG. 9.

In the case of an objective with a chromatic aberration, we increase the cross section of detection, because each wavelength has a different focal zone along the optical axis.

In the case of achromatic objective, it is possible to think about the Particle—Beam interaction as two separate interactions for the same particle. Each interaction explores the particle's refractive index with a different wavelength, and improves the SNR and the ability to characterize the particles based on their spectral behavior.

(3) Use of Polarization:

In other embodiments of the present invention, polarizing optical elements are included to enable enhanced performance of the system and investigation of properties of the particles that are revealed by polarized light.

The detection via crossed polarizers allows a birefringent signal from the particle to be detected while reducing the background noise.

(4) Use of Dual Path/Multiple Path Detection Scheme:

Another embodiment of the present invention is of dual path or multiple path (multi-path) of the beam through the particle, thus improving the signal level. The same beam is re-directed again to interact with the same particle in the cuvette, and by that increases the SNR.

This is shown in FIG. 10, which demonstrates a single-path setup 1001, a double-path (or dual-path) setup 1002, and a multi-path (or multiple-path) setup 1003, in accordance with some embodiments of the present invention.

In the embodiments shown in FIG. 10, for example: numeral 1 indicates the laser (e.g., laser transmitter, laser generator, laser beam source); numeral 2 indicates an isolator; numeral 3 indicates a beam expander; numeral 4 indicates a mirror; numeral 5 indicates a phase mask; numeral 6 indicates a half-wave plate; numeral 7 indicates a mirror; numeral 8 indicates an objective; numeral 9 indicates a cuvette; numeral 10 indicates a collecting optics element; numeral 11 indicates a detector; numeral 12 indicates a polarized beam splitter; numeral 13 indicates a mirror; numeral 14 indicates a quarter-wave plate; numeral 15 indicates a semi-transparent mirror.

The explanation for the improvement among single-path, dual-path, and multi-path, is as follows.

Scattering Calculation:

For very small particles compared with the beam diameter, the signal increases each time the beam interacts with the particle.

$$\text{signal} = 2ttS + 2ttSr + 2ttSrr + \ldots = \frac{2St^2}{1-r}$$

Where: t is the transmission parameter of the mirror; r is the reflectance; S is the signal.

For a semi-transparent mirror, we can claim:

$$t^2 + r^2 = 1$$

Therefore, we can write:

$$\text{signal} = 2S(1+r)$$

It can be shown that both the forward and the back scattering can be represented by 1, so one can write:

$$S = S(\text{Forward Scatter}) + S(\text{Back Scatter})$$

For small particles, forward and the back scattering have similar amplitude;

so by choosing r→1, up to 8 times better SNR can be achieved, in some embodiments.

Another explanation relates to the generation of standing waves as a result of the interaction of the propagating and reflected beam. This creates peaks and zeros of the energy along the optical axis. The peak energy is higher and provides higher power density and higher SNR.

Figure 11:
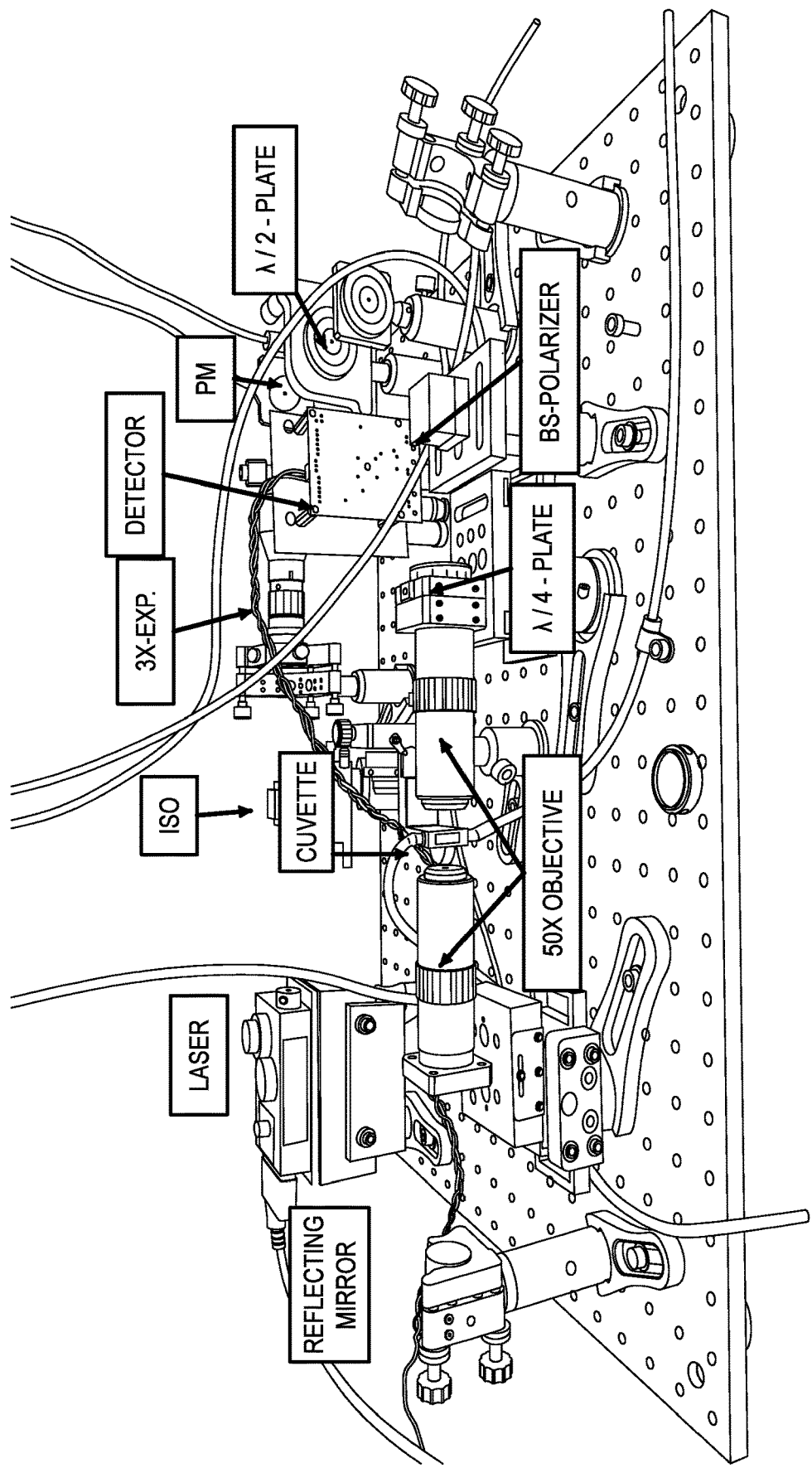
FIG. 11 shows a labeled photograph of an exemplary implementation of an embodiment of the Dual Path system, in accordance with the present invention.

The peak is narrow along the optical axis Z, but this can be well compensated by extending the beam in the X direction, A labeled photograph of a representative implementation of a Dual Path setup, in accordance with the present invention, is shown in FIG. 11.

Figure 12:
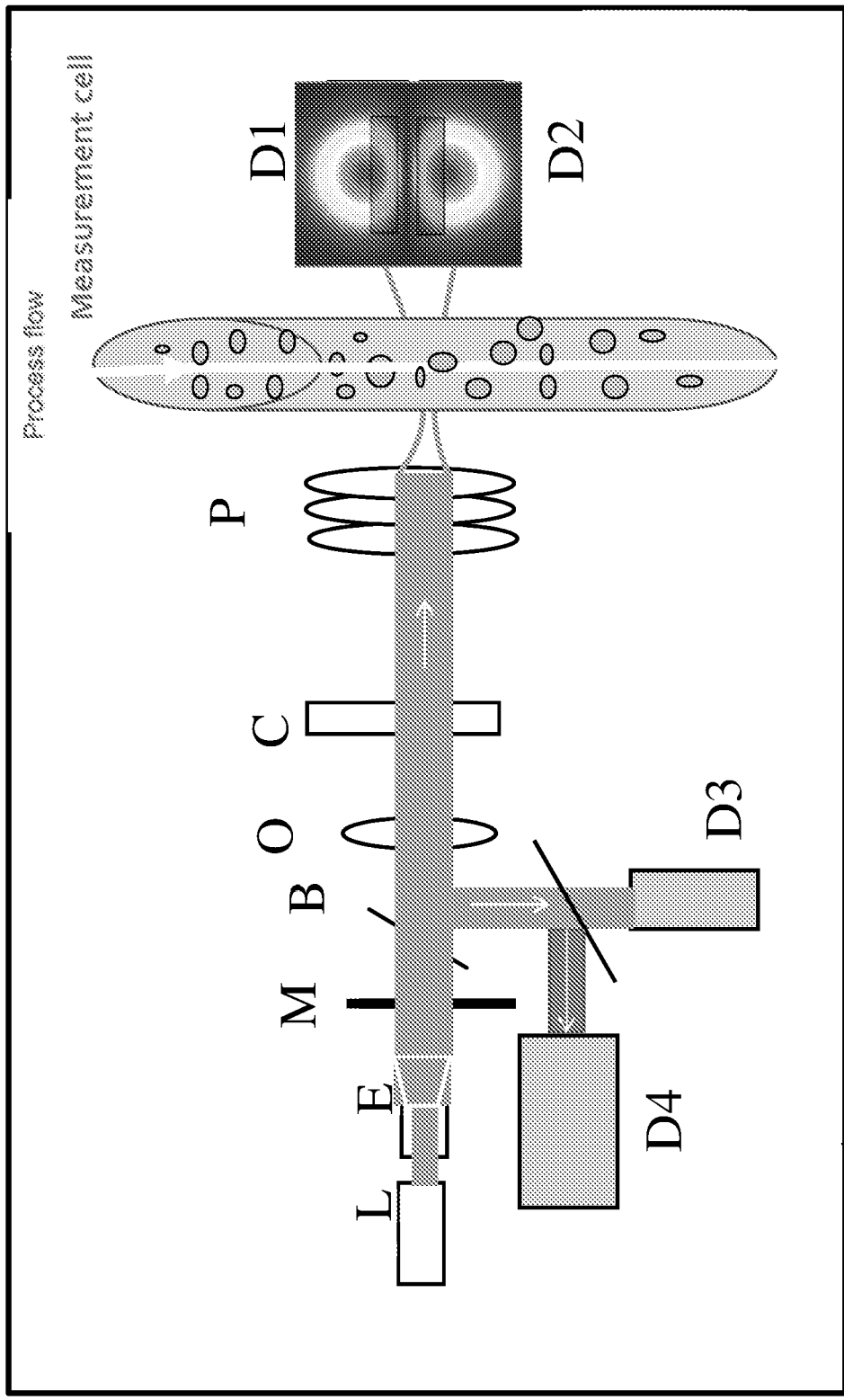
FIG. 12 shows schematically a Fluorescent detection scheme, in accordance with the present invention.

(5) Fluorescence Detection:

Another embodiment of the present invention allows for fluorescent detection. The concept and setup are demonstrated in system 1201 of FIG. 12, in accordance with the present invention.

By using a short wavelength, such as 405 nm illumination for laser L, fluorescence is generated from living organisms; and the additional detection here will allow better clustering and separation between inorganic and organic substances, functioning as a high spatial resolution flow cytometer.

(6) Polarization, Delay and Interferometric Detection:

In an interferometric detection technique, presented above, the signal drops~as (approximately as) the third power of the particle size, whereas the scattering signal drops as the sixth power. SNR can be improved significantly by analyzing dark field rather than bright filed. Further, phase and amplitude can be analyzed separately by aligning the analyzer.

Another embodiment is described herein. In the Dark-Beam (DB) Dual-Pass Common-path Interferometer system, the incoming beam (pump) passes through a calcite and splits to two beams, parallel and perpendicular polarized beams with a short delay in time. The perpendicular polarized beam (leading beam) interacts with the particle, but the other does not. They are recombined by a second crystal, and their interference is monitored on (or by) the detector (dark-field).

Figure 13:
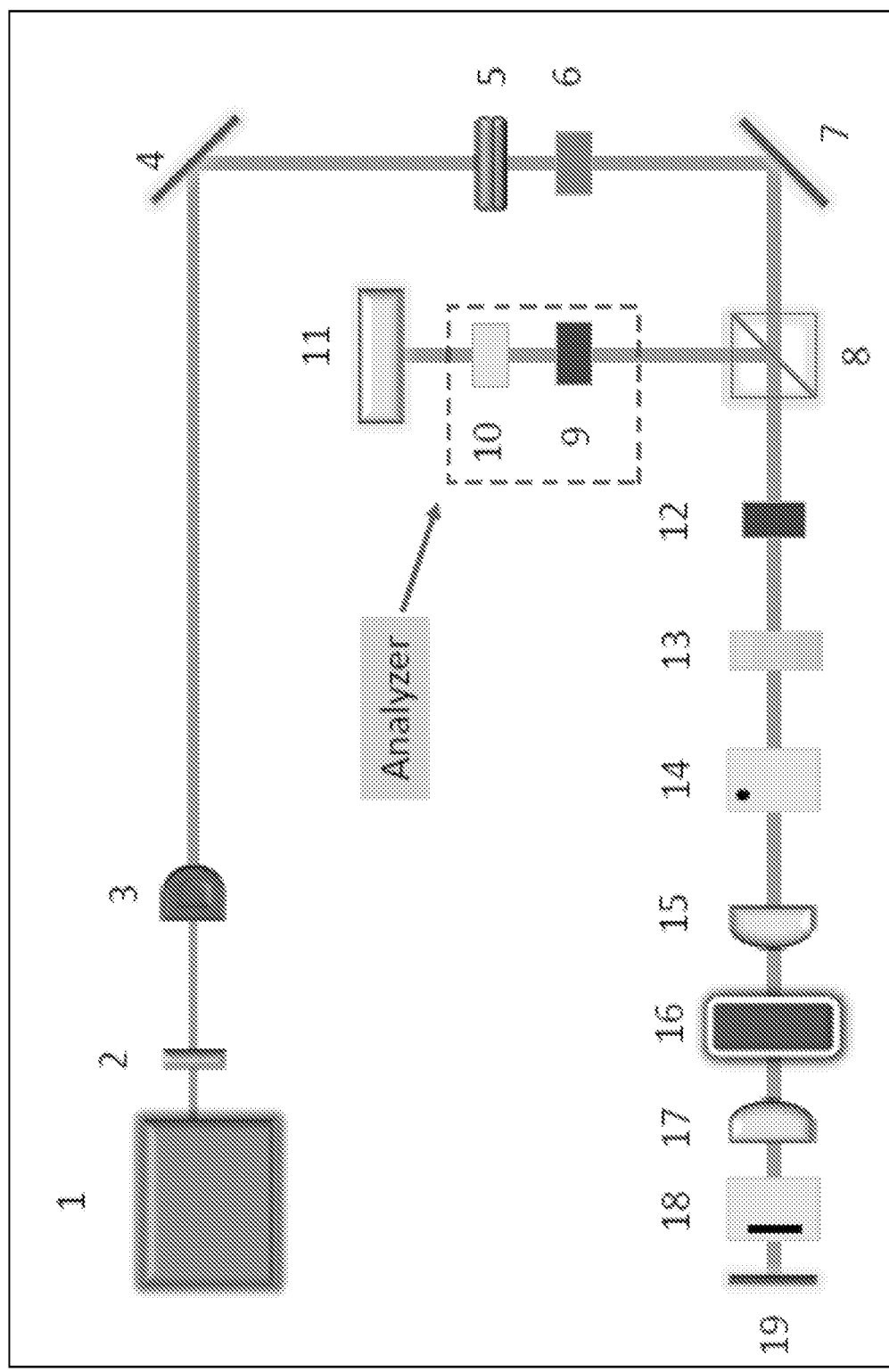
FIG. 13 shows schematically an approach to further enhance the SNR via polarization, in accordance with the present invention.

FIG. 13 shows schematically an approach to further enhance the SNR via polarization, in accordance with the present invention. System 1301 of FIG. 13 demonstrates polarization enhancement to the dual-path or multiple-path detection scheme, in accordance with the present invention.

In FIG. 13, for example: numeral 1 indicates a laser; numeral 2 indicates an isolator; numeral 3 indicates a beam expander; numeral 4 indicates a mirror; numeral 5 indicates a phase mask; numeral 6 indicates a half-wave plate; numeral 7 indicates a mirror; numeral 8 indicates a BS-polarizer (e.g., a beam-splitter polarizer, or a polarizing beam-splitter, or a combined beam-splitter and polarizer); numeral 9 indicates a quarter-wave plate; numeral 10 indicates a polarizer; numeral 11 indicates a detector; numeral 12 indicates a quarter-wave plate; numeral 13 indicates a polarizer; numeral 14 indicates a calcite or a calcite crystal; numeral 15 indicates an objective; numeral 16 indicates a cuvette; numeral 17 indicates a collecting optics; numeral 18 indicates a calcite or a calcite crystal; numeral 19 indicates a mirror.

As demonstrated in FIG. 13, in the Dark-Beam Dual-Pass Common-path Interferometer, a 45-degrees polarized beam from vertical is passed through a calcite, and splits into two orthogonally polarized beams with a short delay in time (Δt). The perpendicular polarized beam, which is defined by the fast-optical axis of the calcite, travels in front. At time t, the single nanoparticle will interact with the beam, having a phase-shift between two polarizations. Both beams are recombined by a second calcite, and their interference is monitored on the detector.

Due to dark-field operation of this interferometry, the resolution of detection is photon-noise limited. Also, since the amplitude and phase response of the scattered field are separated in this system, thus, one can extract information hidden in phase (scattering) and amplitude (absorption). This can be done by only adjusting the angles between polarizer and quarter-wave plate.

This interferometry is operated on Homodyne mode, but can also be operated at reflection mode (Heterodyne mode). In that case, only one calcite crystal is needed.

Some embodiments of the present invention include an optical system for particle size and concentration analysis, the optical system comprising: (a) at least one laser that produces an illuminating beam; (b) a focusing lens that focuses said illuminating beam on particles that move relative to the illuminating beam at known angles to the illuminating beam through the focal region of the focusing lens; (c) at least two forward-looking detectors, that detect interactions of particles with the illuminating beam in the focal region of the focusing lens; wherein the focusing lens is a cylindrical lens that forms a focal region that is: (i) narrow in the direction of relative motion between the particles and the illuminating beam, and (ii) wide in a direction perpendicular to a plane defined by an optical axis of the system and the direction of relative motion between the particles and the illuminating beam; wherein each of the two forward-looking detectors is comprised of two segmented linear arrays of detectors.

In some embodiments, the system is configured to operate on reflection from a surface to detect particles on the surface.

In some embodiments, the system is configured to operate on reflection from a wafer surface to detect particles on the wafer surface.

In some embodiments, the system further comprises: a back-scatter detector to perform back-scatter detection and/or for focus determination of the particle pathing through a cuvette.

In some embodiments, the system further comprises: a back-scatter detector to perform color analysis of the particle.

In some embodiments, the system further comprises: a back-scatter detector to perform fluorescence detection enabling to differentiate between organic particles and inorganic particles.

In some embodiments, the system further comprises: dichroic mirror to detect both back-scatter and fluorescence.

In some embodiments, the system further comprises: a particle velocity measurement unit, to determine particle velocity based on the time of flight of the particle through two peaks of a Dark Beam.

In some embodiments, the system is configured to operate in a Dual Path mode which enhances the detection via super-position of two interactions of the particle with the propagating beam and the reflected beam.

In some embodiments, two mirrors create a resonator which enables multiple paths of the signal and thereby an enhanced signal.

In some embodiments, the system utilizes crossed-polarization (i) to eliminate the laser background signal, and (ii) to benefit from birefringence of particles, and (iii) to enable dark field detection.

In some embodiments, the system further comprises: a data acquisitions sub-system for a dual array with periodicity in detection, to enable detection of small and large particles.

In some embodiments, the system further comprises: a pattern matching unit, to perform pattern matching of (i) an array of synthetically generated potential interactions, with (ii) the actual interaction, and to enable particle detection at lower SNR ratio by utilizing pattern matching.

In some embodiments, the system utilizes a Dark Beam.

In some embodiments, the system utilizes a Gaussian Beam.

In some embodiments, the system utilizes both a Dark Beam and a Gaussian Beam.

In some embodiments, the system utilizes multiple different wavelengths.

In some embodiments, the system utilizes multiple different wavelengths with a chromatic objective to enhance the interaction volume.

In some embodiments, the system utilizes multiple different wavelengths with an achromatic objective to derive more information on the particles.

In some embodiments, the system is configured as a Dual Path setup which comprises a Dual Path in the Dark-Beam (DB) and a common-path Interferometer; wherein an incoming beam (pump) is passed through a calcite, and splits to two beams, which are parallel and perpendicular polarized beams with a short delay in time; wherein the perpendicular polarized beam (leading beam) interacts with the particle; wherein the parallel polarized beam does not interact with the particle; wherein the two beams are recombined by a second crystal, and wherein their interference is monitored on the detector (dark-field layout).

The system(s) of the present invention may optionally comprise, or may be implemented by utilizing suitable hardware components and/or software components; for example, processors, processor cores, Central Processing Units (CPUs), Digital Signal Processors (DSPs), GPUs, circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic sensor(s), optical sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, Graphics Processing Unit (GPU), location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

BIBLIOGRAPHY/REFERENCES

The following publications are hereby incorporated by reference in their entirety; and embodiments of the present invention may optionally comprise or utilize any components, systems, methods and/or operations described in any of the following publications:

1. T. Allen, Particle Size Analysis, John Wiley & Sons; ISBN: 0471262218; June, 1983.
2. W. Tscharnuter, B. Weiner and N. Karasikov, TOT theory.
3. R. Piestun, and J. Shamir, "Synthesis of three-dimensional light-fields and applications" Proc. IEEE, Vol. 90(2), 220-244, (2002).
4. R. Piestun, and J. Shamir, "Control of wavefront propagation with diffractive elements," Opt. Lett., Vol. 19, pp. 771-773, (1994).
5. B. Spektor, R. Piestun and J. Shamir, "Dark beams with a constant notch," Opt. Lett., Vol. 21, pp. 456-458, 911 (1996).
6. R. Piestun, B. Spektor and J. Shamir, "Unconventional Light Distributions in 3-D domains," J. Mod. Opt., Vol. 43, pp. 1495-1507, (1996).

7. R. Piestun, B. Spektor and J. Shamir, "Wave fields in three dimensions: Analysis and synthesis," J. Opt. Soc. Am. A, Vol. 13, pp. 1837-1848, (1996).
8. M. Friedmann and J. Shamir, "Resolution enhancement by extrapolation of the optically measured spectrum of surface profiles," Appl. Opt. Vol. 36, pp. 1747-1751, (1997).
9. R. Piestun, B. Spektor and J. Shamir, "Pattern generation with extended focal depth," Appl. Opt., Vol. 37, pp. 5394-5398, (1998).
10. N. Stanley-Wood, Roy W. Lines, Particle Size Analysis, The Royal Society of Chemistry, ISBN: 0851864872, 1992.
11. Alfred M. Bruckstein, David L. Donoho, Michael Elad: "From Sparse Solutions of Systems of Equations to Sparse Modeling of Signals and Images", SIAM Review (2009)—Society for Industrial and Applied Mathematics, Volume 51, Number 1, pages 34-81,

What is claimed is:

1. An optical system for particle detection configured to operate in a Dual Path mode, the optical system comprising:
   (a) an optical source for generating an illuminating beam in a propagating direction;
   (b) a flow cell positioned in a particle detection region, the flow cell comprising a fluid flow inlet and a fluid flow outlet, the flow cell configured for receiving the illuminating beam and for passing a fluid flow having one or more particles into the fluid flow inlet, along a flow direction through the illuminating beam, and out the fluid flow outlet;
   (c) a first optical element that receives said illuminating beam from said optical source and focuses said illuminating beam on the one or more particles in the fluid flow at a focal region of the first optical element;
   (d) a beam splitter for transmitting at least a portion of the illuminating beam in the propagating direction;
   (e) a reflective surface configured to reflect at least a portion of the illuminating beam after interacting with said one or more particles in said particle detection region, thereby generating a reflected beam in a reflected direction, wherein said beam splitter directs at least a portion of the reflected beam to first and second forward-looking detectors; and
   (f) the first and second forward-looking detectors each configured to detect light that has interacted with the one or more particles in both a first interaction in the propagating direction and a second interaction in the reflected direction, wherein:
      (1) the first interaction produces light transmitted, scattered, or both, forward of the one or more particles along the propagating direction upon interaction of the one or more particles and the illuminating beam, and
      (2) the second interaction produces light transmitted, scattered, or both, forward of the particles along the reflected direction upon interaction of the one or more particles and the reflected beam,
   wherein each of the first and second forward-looking detectors comprises a segmented linear detector array; wherein the first detector is configured to detect light from a first region of the flow cell thereby generating a first signal, and the second detector is configured to detect light from a second region of the flow cell positioned down stream of said first region along said flow direction, thereby generating a second signal; and
   (g) an analyzer for receiving the first signal from the first detector and the second signal from the second forward looking detector; wherein the analyzer generates a differential signal from the first signal and the second signal characteristic of the particles.

2. The optical system of claim 1, wherein said illuminating beam comprises a Gaussian beam, a structured non-Gaussian beam, or a structured dark beam.

3. The optical system of claim 2, wherein said optical source comprises a laser and a phase element for generating said illuminating beam comprising a structured non-Gaussian beam, a dark beam, or a structured dark beam.

4. The optical system of claim 1, wherein said reflective surface comprises a mirror.

5. The optical system of claim 1, wherein said first optical element comprises a beam shaping optical system for generating an anamorphic beam from said illuminating beam which is provided to the particle detection region.

6. The optical system of claim 1, wherein said first optical element comprises a cylindrical lens.

7. The optical system of claim 1, further comprising a second optical element for receiving and focusing said reflected beam on said one or more particles in said particle detection region at a focal region of the second optical element.

8. The optical system of claim 7, wherein the focal region of the first optical element and the focal region of the second optical element are overlapping.

9. The optical system of claim 7, wherein said second optical element comprises a cylindrical lens.

10. The optical system of claim 1, wherein said analyzer analyzes said differential signals in a time domain.

11. The optical system of claim 1, wherein said analyzer counts said one or more particles based on said differential signals or characterizes the size of said particles based on said differential signals.

12. The optical system of claim 1, wherein said analyzer comprises a pattern matching unit, to perform a pattern matching of (i) an array of synthetically generated potential interactions, with (ii) the differential signals.

13. The optical system of claim 1, wherein said analyzer compares each differential signal with a pre-generated library of known signals corresponding to particles to determine if each differential signal corresponds to a particle detection event or laser noise.

14. The optical system of claim 1, wherein each differential signal is converted to a frequency domain using a Fourier transformation or a fast Fourier transformation by said analyzer.

15. The optical system of claim 12, wherein the pattern matching is performed using a convolution of the differential signal against a bank of variable delay and variable width matched filters according to equation (1):

$$y_k(t) = x(b) * h_k(t) \tag{1}$$

wherein $x(t)$ is the differential signal; $h_k(t)$ is a specific matching filter normalized to unit energy; and $y_k(t)$ is an output signal.

16. The optical system of claim 15, wherein a mean sensor response is represented by equation (2):

$$f_{\sigma,m}(t) = \frac{d}{dt} e^{-\left(\frac{t-m}{\sigma}\right)^2} \cong -2\left(\frac{t-m}{\sigma}\right) e^{-\left(\frac{t-m}{\sigma}\right)^2} \tag{2}$$

wherein $f_{\sigma,m}(t)$ is the mean sensor response, m is a delay parameter, $\sigma$ is a width parameter, t is a time parameter, and amplitude values are ignored.

17. The optical system of claim 16, wherein the illuminating beam comprises two interacting lobes wherein a total filter response $h_{\sigma,m}(t)$ is represented by equation (3):

$$h_{\sigma,m}(t) = f_{\sigma,m}(t) - f_{-\sigma,m} \cong -\left(\frac{t-m}{\sigma}\right)e^{-\left(\frac{t-m}{\sigma}\right)^2} + \left(\frac{t+m}{\sigma}\right)e^{-\left(\frac{t+m}{\sigma}\right)^2} \quad (3)$$

wherein each interacting lobe is assumed to be symmetric around zero, $f_{\sigma,m}(t)$ and $f_{-\sigma,m}(t)$ are the mean sensor responses for each interacting lobe, m is the delay parameter, $\sigma$ is the width parameter, and t is the time parameter.

18. The optical system of claim 17, wherein a set of matched filters $h_k(t)$ is generated, wherein k describes a certain pair {mk, σk}, each filter is designed with m and σ parameters for positive and negative data channels, an absolute value of each output signal $y_k(t)$ is computed, a maximum output signal is compared with a threshold, parameters of the filter that created the maximum output signal above the threshold are employed as indicators for m and σ, amplitude is taken from maximal $y_k(t)$, and optionally a histogram is computed and/or generated.

19. The optical system of claim 1, wherein the beam splitter is a polarizing beam splitter, and wherein the optical system further comprises a quarter wave plate for altering a polarization state of said illuminating beam, said quarter wave plate being positioned between the polarizing beam splitter and the particle detection region.

20. The optical system of claim 1, wherein the reflective surface comprises a mirror in optical communication with said flow cell.

21. The optical system of claim 1, further comprising a second optical element that receives the illuminating beam after interacting with said one or more particles in said particle detection region and focuses the illuminating beam on the reflective surface.

22. The optical system of claim 1, further comprising an isolator positioned between the optical source and the reflective surface.

23. The optical system of claim 1, wherein said illuminating beam comprises an anamorphic beam.

24. The optical system of claim 23, wherein said anamorphic beam comprises a top hat beam.

25. The optical system of claim 1, wherein the flow cell is removably integrated with the optical system.

* * * * *